US01250557B2

(12) United States Patent
Kuma et al.

(10) Patent No.: US 12,505,577 B2
(45) Date of Patent: Dec. 23, 2025

(54) INFORMATION PROCESSING APPARATUS AND METHOD FOR PROHIBITING THE COMBINED USE OF SCALABLE ENCODING AND SCALING ENCODING

(71) Applicant: SONY GROUP CORPORATION, Tokyo (JP)

(72) Inventors: Satoru Kuma, Tokyo (JP); Ohji Nakagami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 407 days.

(21) Appl. No.: 17/928,836

(22) PCT Filed: Jun. 8, 2021

(86) PCT No.: PCT/JP2021/021665
§ 371 (c)(1),
(2) Date: Nov. 30, 2022

(87) PCT Pub. No.: WO2021/261237
PCT Pub. Date: Dec. 30, 2021

(65) Prior Publication Data
US 2023/0177735 A1 Jun. 8, 2023

(30) Foreign Application Priority Data
Jun. 22, 2020 (JP) ................................. 2020-106974

(51) Int. Cl.
*G06T 9/00* (2006.01)
*G06T 9/40* (2006.01)

(52) U.S. Cl.
CPC ................ *G06T 9/001* (2013.01); *G06T 9/40* (2013.01)

(58) Field of Classification Search
CPC .......... G06T 9/001; G06T 9/40; H04N 19/30; H04N 19/597; H04N 19/70
See application file for complete search history.

(56) References Cited

U.S. PATENT DOCUMENTS 7,813,431 B2 * 10/2010 MacInnis ............ H04N 19/423
375/240.24
12,301,872 B2 * 5/2025 Oh ......................... H04N 19/42
(Continued)

FOREIGN PATENT DOCUMENTS

JP 2018-534881 A 11/2018
WO WO 2019/142665 A1 7/2019
(Continued)

OTHER PUBLICATIONS

Nakagami et al., [G-PCC] Spatial scalability support for G-PCC, International Organisation for Standardisation Coding of Moving Pictures and Audio, Mar. 2019, pp. 1-15, ISO/IEC JTC1/SC29/WG11 MPEG2019/m47352, Geneva, CH.
(Continued)

*Primary Examiner* — Mia M Thomas
(74) *Attorney, Agent, or Firm* — Paratus Law Group, PLLC

(57) ABSTRACT

There is provided an information processing apparatus and method that enable to more easily achieve scalable decoding of point cloud data. In encoding of a point cloud representing an object having a three-dimensional shape as a set of points, control is performed so as to prohibit combined use of scalable encoding that is an encoding method for generating scalably decodable coded data and scaling encoding that is an encoding method involving a change in a tree structure of geometry data. The present disclosure can be applied to, for example, an information processing apparatus, an image processing apparatus, an encoding device, a
(Continued)

decoding device, an electronic device, an information processing method, a program, or the like.

20 Claims, 24 Drawing Sheets

(56) References Cited

U.S. PATENT DOCUMENTS

| | | | |
|---|---|---|---|
| 2017/0347122 A1 | 11/2017 | Chou | |
| 2019/0080483 A1 | 3/2019 | Mammou | |
| 2020/0107048 A1 | 4/2020 | Yea | |
| 2021/0209812 A1* | 7/2021 | Han | H04N 19/46 |
| 2021/0281880 A1* | 9/2021 | Litwic | H04N 19/184 |
| 2022/0174317 A1* | 6/2022 | Oh | H04N 19/96 |
| 2023/0080133 A1* | 3/2023 | Meier | G08G 1/166 |
| | | | 382/103 |
| 2023/0316584 A1* | 10/2023 | Oh | G06T 9/001 |
| | | | 382/243 |
| 2023/0334703 A1* | 10/2023 | Oh | G06T 9/00 |
| 2023/0379499 A1* | 11/2023 | Oh | G06T 9/40 |
| 2023/0386088 A1* | 11/2023 | Oh | H04N 19/174 |
| 2024/0323434 A1* | 9/2024 | Oh | H04N 19/96 |
| 2024/0331206 A1* | 10/2024 | Oh | H04N 19/119 |
| 2024/0354998 A1* | 10/2024 | Takeda | H04N 21/816 |
| 2024/0386615 A1* | 11/2024 | Oh | H04N 19/70 |
| 2025/0071347 A1* | 2/2025 | Oh | H04N 19/30 |
| 2025/0086802 A1* | 3/2025 | Ye | G06V 20/64 |
| 2025/0095211 A1* | 3/2025 | Oh | H04N 19/597 |
| 2025/0133233 A1* | 4/2025 | Oh | G06T 9/00 |
| 2025/0227295 A1* | 7/2025 | Oh | H04N 19/597 |

FOREIGN PATENT DOCUMENTS

| | | |
|---|---|---|
| WO | WO 2019/159956 A1 | 8/2019 |
| WO | WO-2020071115 A1 | 4/2020 |

OTHER PUBLICATIONS

Mekuria et al., Design, Implementation and Evaluation of a Point Cloud Codec for Tele-Immersive Video, IEEE Transactions on Circuits and Systems for Video Technology, Jan. 2016, pp. 1-14.

Zhang et al., [G-PCC] [New proposal] Signaling delta QPs for adaptive geometry quantization in point cloud coding, International Organisation for Standardisation Coding of Moving Pictures and Audio, Jul. 2019, pp. 1-10, ISO/IEC JTC1/SC29/WG11 MPEG2019/m49232, Gothenburg, Sweden.

"Information technology—MPEG-I (Coded Representation of Immersive Media)—Part 9: Geometry-based Point Cloud Compression","G-PCC Future Enhancements", 128. MPEG Meeting; Oct. 7, 2019-Oct. 11, 2019; Geneva; (Motion Picture Expert Group or ISO/IEC JTC1/SC29/WG11), No. n18887 Dec. 23, 2019 (Dec. 23, 2019), XP030225586.

Graziosi D. et al: "An overview of ongoing point cloud compression standardization activities: video-based (V-PCC) and geometry-based (G•PCC)", APSIPA Transactions on Signal and Information Processing, vol. 9, No. 1, Jan. 1, 2020 (Jan. 1, 2020), XP093012170, ISSN: 2048-7703, DOI:10.1017/ATSIP.2020.12.

Satoru Kuma (Sony) et al: "[G-PCC] Confirmation report on interaction between geometry scaling and scalable lifting", 131. MPEG Meeting; Jun. 29, 2020-Jul. 3, 2020; Online; (Motion Picture Expert Group or ISO/IEC JTC1/SC29/WG11), No. m54598 Jun. 24, 2020 (Jun. 24, 2020), XP030289083.

* cited by examiner

FIG. 8

| | uniq point | point1 | point2 | point3 | point4 | point5 | point6 |
|---|---|---|---|---|---|---|---|
| input | 6 | 100 | 101 | 102 | 103 | 104 | 105 |

A

| decoded | uniq point | point1 | point2 | point3 | point4 | point5 | point6 |
|---|---|---|---|---|---|---|---|
| baseQP=0 | 6 | 100 | 101 | 102 | 103 | 104 | 105 |
| baseQP=1 | 5 | 100 | 101 | 103 | 103 | 104 | 105 |
| baseQP=2 | 4 | 100 | 102 | 102 | 103 | 105 | 105 |
| baseQP=3 | 4 | 100 | 102 | 102 | 104 | 104 | 105 |
| baseQP=4 | 4 | 100 | 102 | 102 | 104 | 104 | 106 |
| baseQP=5 | 3 | 100 | 100 | 103 | 103 | 105 | 105 |
| baseQP=6 | 3 | 100 | 100 | 103 | 103 | 103 | 106 |
| baseQP=7 | 2 | 100 | 100 | 104 | 104 | 104 | 104 |
| baseQP=8 | 2 | 100 | 100 | 104 | 104 | 104 | 104 |
| baseQP=9 | 2 | 100 | 100 | 100 | 105 | 105 | 105 |
| baseQP=10 | 2 | 100 | 100 | 100 | 100 | 106 | 106 |
| baseQP=11 | 2 | 100 | 100 | 100 | 100 | 100 | 107 |
| baseQP=12 | 1 | 100 | 100 | 100 | 100 | 100 | 100 |

| COMBINED USE OF SCALABLE DECODABLE ENCODING AND PROCESS OF UPDATING TREE STRUCTURE OF GEOMETRY DATA IS PROHIBITED | | |
|---|---|---|
| 1 | COMBINED USE OF Lifting Scalability AND Geometry Scaling IS PROHIBITED | |
| 1-1 | | Geometry Scaling IS PROHIBITED IN CASE WHERE Lifting Scalability IS PERFORMED |
| 1-2 | | Lifting Scalability IS PROHIBITED IN CASE WHERE Geometry Scaling IS PERFORMED |
| 2 | SETTING OF PERMISSION (PROHIBITION) FLAG | |
| 2-1 | | PROHIBITING IN SEMANTICS |
| 2-2 | | PROHIBITING IN PROFILE |
| 2-3 | | LIMITING IN SYNTAX |

FIG. 12

161 lifting_scalability_enabled_flag equal to 1 specifies that the attribute decoding process allows the pruned octree decode result for the input geometry points. lifting_scalability_enabled_flag equal to 0 specifies that the attribute decoding process requires the complete octree decode result for the input geometry points.
When not present, the value of lifting_scalability_enabled_flag is inferred to be 0.
When the value of log2_trisoup_node_size is greater than 0, the value of lifting_scalability_enabled_flag shall be 0.
When the value of geom_scaling_enabled_flag is greater than 0, the value of lifting_scalability_enabled_flag shall be 0.

FIG. 14

```
163 ┐  if ( attr_coding_type == 2 ) // lifting
         if ( geom_scaling_enabled_flag )
           lifting_scalability_enabled_flag                u(1)
```

INFORMATION PROCESSING APPARATUS AND METHOD FOR PROHIBITING THE COMBINED USE OF SCALABLE ENCODING AND SCALING ENCODING

CROSS REFERENCE TO PRIOR APPLICATION

This application is a National Stage Patent Application of PCT International Patent Application No. PCT/JP2021/021665 (filed on Jun. 8, 2021) under 35 U.S.C. § 371, which claims priority to Japanese Patent Application No. 2020-106974 (filed on Jun. 22, 2020), which are all hereby incorporated by reference in their entirety.

TECHNICAL FIELD

The present disclosure relates to an information processing apparatus and method, and particularly relates to an information processing apparatus and method that can more easily achieve scalable decoding of point cloud data.

BACKGROUND ART

Conventionally, an encoding method for 3D data representing a three-dimensional structure such as, for example, a point cloud has been considered (for example, see Non Patent Document 1). Furthermore, an encoding method that enables scalable decoding of coded data of this point cloud has been proposed (for example, see Non Patent Document 2). In a case of a method described in Non Patent Document 2, scalable decoding is achieved by causing a reference structure of attribute data to be similar to a tree structure of geometry data.

Meanwhile, a method of scaling geometry data at a time of encoding of such a point cloud to thin out points has been proposed (for example, see Non Patent Document 3).

CITATION LIST

Non Patent Document

Non Patent Document 1: R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf Non Patent Document 2: Ohji Nakagami, Satoru Kuma, "[G-PCC] Spatial scalability support for G-PCC", ISO/IEC JTC1/SC29/WG11 MPEG2019/m47352, March 2019, Geneva, CH Non Patent Document 3: Xiang Zhang, Wen Gao, Sehoon Yea, Shan Liu, "[G-PCC][New proposal] Signaling delta QPs for adaptive geometry quantization in point cloud coding", ISO/IEC JTC1/SC29/WG11 MPEG2019/m49232, July 2019 Gothenburg, Sweden

SUMMARY OF THE INVENTION

Problems to be Solved by the Invention

However, when geometry data is scaled and points are thinned out as described in Non Patent Document 3, the tree structure of the geometry data changes. Therefore, there has been a possibility that a mismatch occurs between the reference structure of the attribute data and the tree structure of the geometry data, and scalable decoding can no longer be performed. In other words, in order to achieve scalable decoding when geometry data is scaled as described in Non Patent Document 3, it has been necessary to form a reference structure of attribute data to correspond to scaling of the geometry data. That is, in order to encode point cloud data so as to enable scalable decoding, the attribute data reference structure has to be changed depending on whether or not the geometry data is scaled, and there has been a possibility that complicated processing is required.

The present disclosure has been made in view of such a situation, and an object thereof is to more easily achieve scalable decoding of point cloud data.

Solutions to Problems

An information processing apparatus according to one aspect of the present technology is an information processing apparatus including: an encoding control unit configured to perform control so as to prohibit combined use of scalable encoding that is an encoding method for generating scalably decodable coded data and scaling encoding that is an encoding method involving a change in a tree structure of geometry data, in encoding of a point cloud representing an object having a three-dimensional shape as a set of points.

An information processing method according to one aspect of the present technology is an information processing method including: performing control so as to prohibit combined use of scalable encoding that is an encoding method for generating scalably decodable coded data and scaling encoding that is an encoding method involving a change in a tree structure of geometry data, in encoding of a point cloud representing an object having a three-dimensional shape as a set of points.

In the information processing apparatus and method according to one aspect of the present technology, in encoding of a point cloud representing an object having a three-dimensional shape as a set of points, control is performed so as to prohibit combined use of scalable encoding that is an encoding method for generating scalably decodable coded data and scaling encoding that is an encoding method involving a change in a tree structure of geometry data.

BRIEF DESCRIPTION OF DRAWINGS

FIG. 8 is a view for explaining an example of geometry scaling.

FIG. 11 is a view for explaining an example of encoding control.

FIG. 12 is a view for explaining an example of semantics.

FIG. 14 is a view for explaining an example of syntax.

MODE FOR CARRYING OUT THE INVENTION

Figure 1:
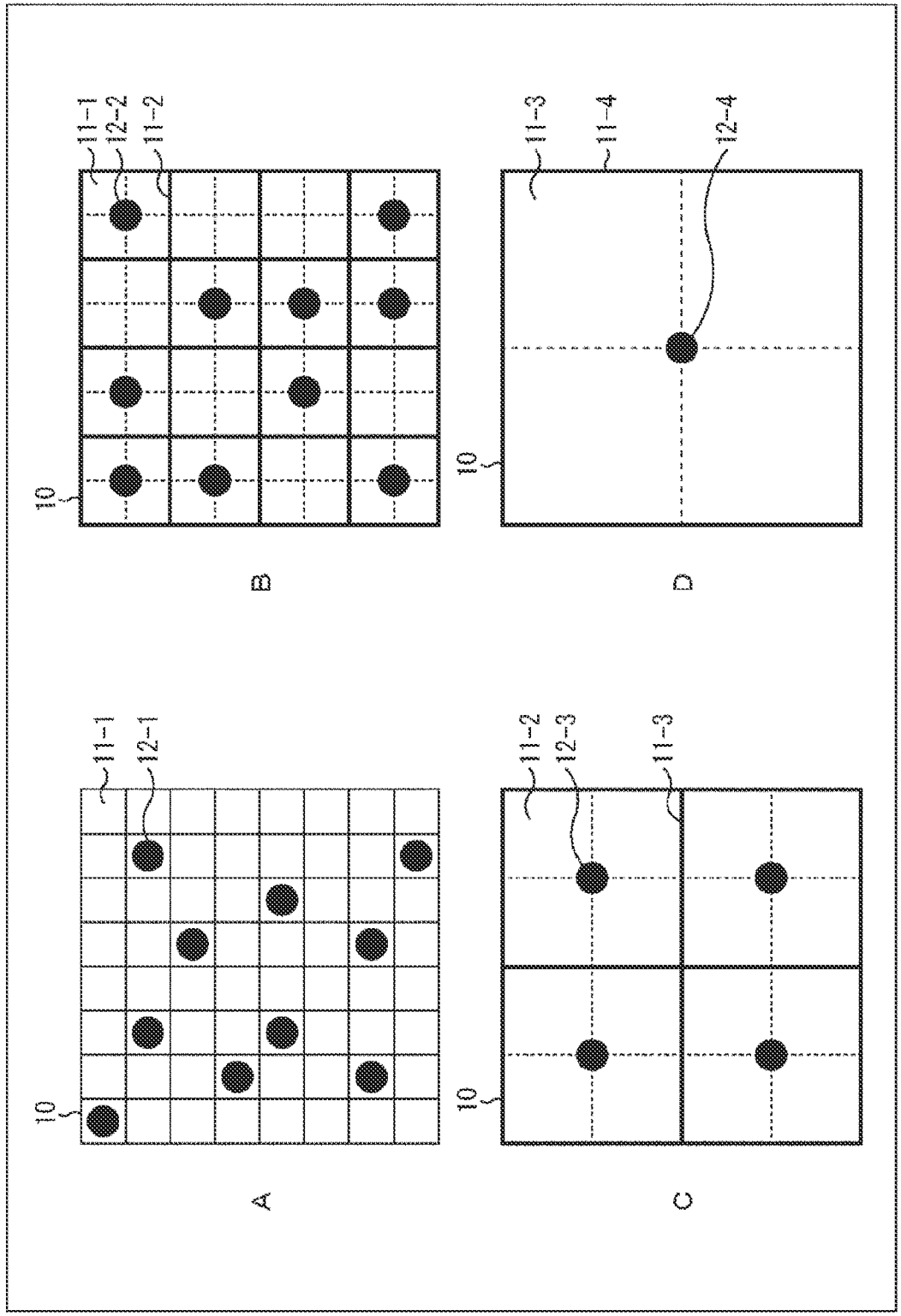
FIG. 1 is a view for explaining an example of layering of geometry data.

Hereinafter, embodiments for implementing the present disclosure (hereinafter, referred to as embodiments) will be described. Note that the description will be given in the following order.
1. Encoding control
2. First embodiment (encoding device)
3. Second embodiment (decoding device)
4. Supplementary note 1. Encoding Control <Documents and the Like that Support Technical Contents and Technical Terms>

The scope disclosed in the present technology includes not only the contents described in the embodiment, but also the contents described in the following non patent documents known at the time of filing of the application.
Non Patent Document 1: (described above)
Non Patent Document 2: (described above)
Non Patent Document 3: (described above)
Non Patent Document 4: Khaled Mammou, Alexis Tourapis, Jungsun Kim, Fabrice Robinet, Valery Valentin, Yeping Su, "Lifting Scheme for Lossy Attribute Encoding in TMC1", ISO/IEC JTC1/SC29/WG11 MPEG2018/ m42640, April 2018, San Diego, US That is, the contents described in the above-described Non Patent Documents, the contents of other documents referred to in the above-described Non Patent Documents, and the like are also basis for determining the support requirement.

<Point Cloud>

Conventionally, there has been 3D data such as: a point cloud representing a three-dimensional structure by using position information, attribute information, and the like of points; and a mesh that is configured by vertices, edges, and surfaces and defines a three-dimensional shape by using polygonal representation.

For example, in a case of a point cloud, a three-dimensional structure (a three-dimensional object) is represented by a large number of points. Data of the point cloud (also referred to as point cloud data) includes geometry data (also referred to as position information) and attribute data (also referred to as attribute information) of each point. The attribute data can include any information. For example, color information, reflectance information, normal line information, and the like of each point may be included in the attribute data. As described above, the point cloud data has a relatively simple data structure, and can express any three-dimensional structure with sufficient accuracy by using a sufficiently large number of points.

<Quantization of Position Information with Use of Voxel>

Since such point cloud data has a relatively large data amount, an encoding method using a voxel has been conceived in order to compress the data amount by encoding or the like. The voxel is a three-dimensional region for quantizing geometry data (position information).

That is, a three-dimensional region (also referred to as a bounding box) containing a point cloud is segmented into small three-dimensional regions called voxels, and whether or not a point is contained is indicated for each voxel. By doing in this way, a position of each point is quantized on a voxel basis. Therefore, by converting point cloud data into such data of voxels (also referred to as voxel data), an increase in information amount can be suppressed (typically, an information amount can be reduced).

For example, as illustrated in A of FIG. 1, it is assumed that a bounding box 10 is segmented into a plurality of voxels 11-1 indicated by small rectangles. Note that, here, a three-dimensional space is described as a two-dimensional plane for simplification of description. That is, in practice, the bounding box 10 is a three-dimensional space region, and the voxel 11-1 is a small region of a rectangular parallelepiped (including a cube). The geometry data (position information) of each point 12-1 of point cloud data indicated by a black circle in A of FIG. 1 is corrected so as to be arranged for each voxel 11-1. That is, the geometry data is quantized in units of the voxel. Note that all the rectangles in the bounding box 10 in A of FIG. 1 are voxels 11-1, and all the black circles illustrated in A of FIG. 1 are points 12-1.

<Tree Structure (Octree)>

Moreover, a method of enabling scalable decoding of geometry data by making a tree structure of the geometry data has been conceived. That is, by making it possible to decode nodes from an uppermost layer to any layer of the tree structure, it becomes possible not only to restore geometry data at a highest resolution (a lowermost layer) but also to restore geometry data at a lower resolution (an intermediate layer). That is, it is possible to perform decoding with any resolution without decoding information of unnecessary layers (resolutions)

This tree structure may be any structure. For example, there are a KD Tree, an octree, and the like. The octree is an octant tree, and is suitable for segmentation of a three-dimensional space region (segmentation into two in each of x, y, and z directions). That is, as described above, it is suitable for a structure in which the bounding box 10 is segmented into a plurality of voxels.

For example, one voxel is segmented into two in each of the x, y, and z directions (that is, segmented into eight) to form a voxel in a layer one level lower (also referred to as LoD). In other words, two voxels arranged in each of the x, y, and z directions (that is, eight voxels) are integrated to form a voxel in a layer one level higher (LoD). By recursively repeating such a structure, an octree can be constructed using voxels.

Then, voxel data indicates whether or not each voxel contains a point. In other words, in the voxel data, a position of the point is expressed by a resolution of a voxel size. Therefore, by constructing the octree using the voxel data, scalability of the resolution of the geometry data can be achieved. That is, the octree of the geometry data can be constructed more easily by making a tree structure of the voxel data than by making a tree structure of points scattered at any positions.

For example, in a case of A of FIG. 1, since it is two-dimensional, four voxels 11-1 arranged vertically and horizontally are integrated to form voxels 11-2 in a layer one level higher indicated by a thick line, as illustrated in B of FIG. 1. Then, the geometry data is quantized using the voxel 11-2. That is, when a point 12-1 (A of FIG. 1) exists in the voxel 11-2, the point 12-1 is converted into a point 12-2 corresponding to the voxel 11-2 by correcting a position thereof. Note that, in B of FIG. 1, only one voxel 11-1 is denoted by a reference sign, but all rectangles indicated by dotted lines in the bounding box 10 in B of FIG. 1 are voxels 11-1. Similarly, in B of FIG. 1, only one voxel 11-2 is denoted by a reference sign, but all rectangles indicated by thick lines in the bounding box 10 in B of FIG. 1 are voxels 11-2. Similarly, in B of FIG. 1, only one point 12-2 is denoted by a reference sign, but all black circles illustrated in B of FIG. 1 are points 12-2.

Similarly, as illustrated in C of FIG. 1, four voxels 11-2 arranged vertically and horizontally are integrated to form a voxel 11-3 on one level higher indicated by a thick line. Then, the geometry data is quantized using the voxel 11-3. That is, when a point 12-2 (B of FIG. 1) exists in the voxel 11-3, the point 12-2 is converted into a point 12-3 corresponding to the voxel 11-3 by correcting a position thereof. Note that, in C of FIG. 1, only one voxel 11-2 is denoted by a reference sign, but all rectangles indicated by dotted lines in the bounding box 10 in C of FIG. 1 are voxels 11-2. Similarly, in C of FIG. 1, only one voxel 11-3 is denoted by a reference sign, but all rectangles indicated by thick lines in the bounding box 10 in C of FIG. 1 are voxels 11-3. Similarly, in C of FIG. 1, only one point 12-3 is denoted by a reference sign, but all black circles illustrated in C of FIG. 1 are points 12-3.

Similarly, as illustrated in D of FIG. 1, four voxels 11-3 arranged vertically and horizontally are integrated to form a voxel 11-4 on one level higher indicated by a thick line. Then, the geometry data is quantized using the voxel 11-4. That is, when a point 12-3 (C of FIG. 1) exists in the voxel 11-4, the point 12-3 is converted into a point 12-4 corresponding to the voxel 11-4 by correcting a position thereof. Note that, in D of FIG. 1, only one voxel 11-3 is denoted by a reference sign, but all rectangles indicated by dotted lines in the bounding box 10 in D of FIG. 1 are voxels 11-3.

By doing in this way, a tree structure (an octree) of the geometry data is obtained.

<Lifting>

On the other hand, when attribute data is encoded, encoding is performed using a positional relationship between points on assumption that geometry data including degradation due to encoding is known. As such an encoding method for attribute data, a method using a region adaptive hierarchical transform (RAHT) or a transform called lifting as described in Non Patent Document 4 has been considered. By applying these techniques, it is also possible to layer (makes a tree structure of) a reference structure (a reference relationship) of attribute data, like an octree of geometry data.

For example, in a case of lifting, attribute data of each point is encoded as a difference value from a prediction value derived using attribute data of another point. Then, points at which the difference value is derived (that is, the prediction value is derived) are hierarchically selected.

Figure 2:
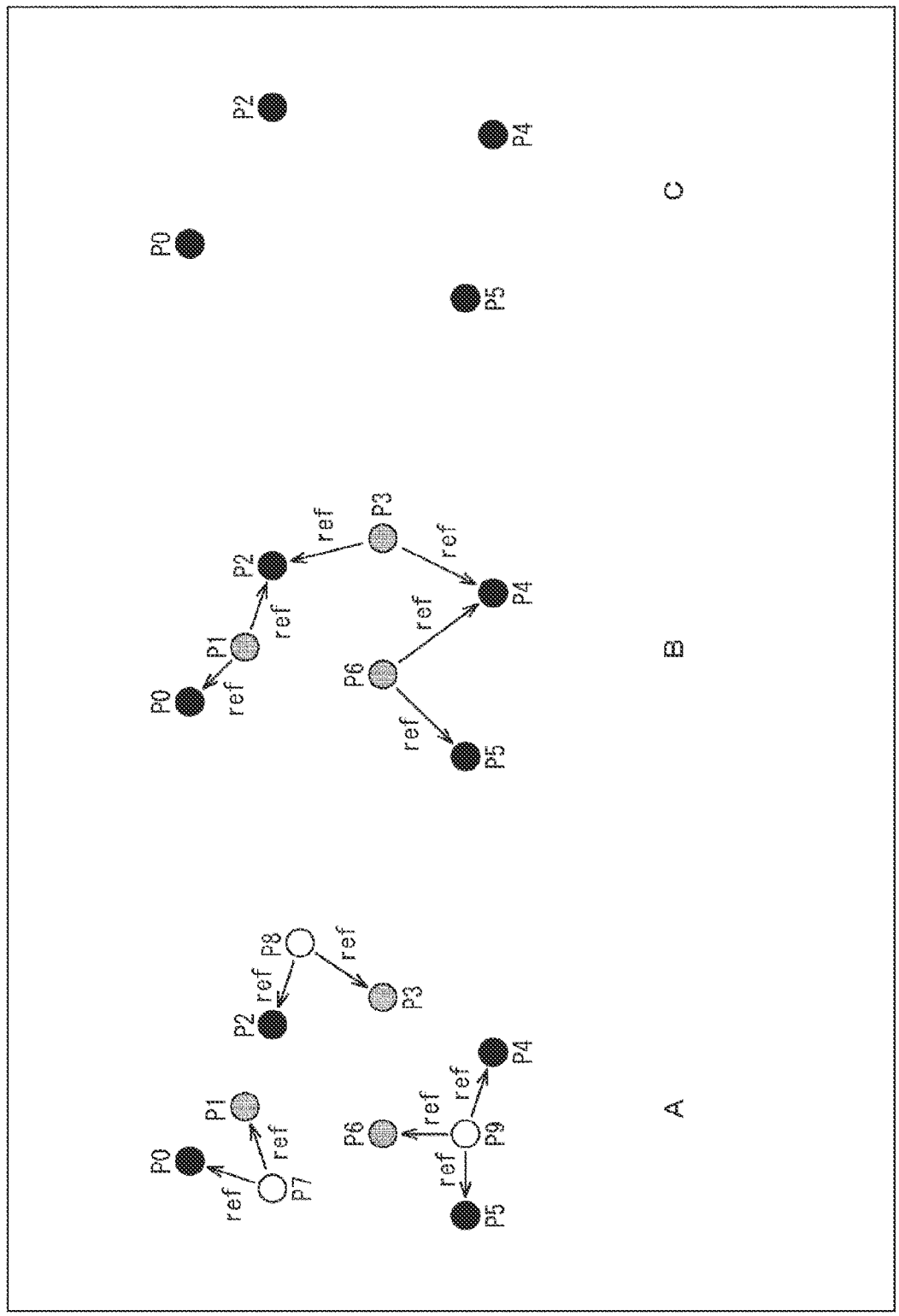
FIG. 2 is a view for explaining an example of Lifting.

For example, in a layer illustrated in A of FIG. 2, setting is performed such that points P7, P8, and P9 indicated by white circles among individual points (P0 to P9) indicated by circles are selected as prediction points that are points from which a prediction value is derived, and other points P0 to P6 are selected as reference points that are points whose attribute data is referred to at a time of the deriving of the prediction value. That is, in this layer, a difference value between attribute data and a prediction value thereof is derived for each of the prediction points P7 to P9.

Note that, in FIG. 2, a three-dimensional space is described as a two-dimensional plane for simplification of description. That is, in practice, the individual points P0 to P6 are arranged in a three-dimensional space.

Each arrow in A of FIG. 2 indicates a reference relationship in deriving the prediction value. For example, the prediction value of the prediction point P7 is derived with reference to the attribute data of the reference points P0 and P1. Furthermore, the prediction value of the prediction point P8 is derived with reference to the attribute data of the reference points P2 and P3. Moreover, the prediction value of the prediction point P9 is derived with reference to the attribute data of the reference points P4 to P6. Then, for each of the prediction points P7 to P9, a difference value between the prediction value calculated as described above and the attribute data is derived.

As illustrated in B of FIG. 2, in a layer one level higher than that, classification (sorting) between a prediction point and a reference point similar to a case of the layer in A of FIG. 2 is performed on the points (P0 to P6) selected as reference points in the layer in A of FIG. 2 (a layer one level lower).

For example, points P1, P3, and P6 indicated by gray circles in B of FIG. 2 are selected as prediction points, and points P0, P2, P4, and P5 indicated by black circles are selected as reference points. That is, in this layer, a difference value between attribute data and a prediction value thereof is derived for each of the prediction points P1, P3, and P6.

Each arrow in B of FIG. 2 indicates a reference relationship in deriving the prediction value. For example, the prediction value of the prediction point P1 is derived with reference to the attribute data of the reference points P0 and P2. Furthermore, the prediction value of the prediction point P3 is derived with reference to the attribute data of the reference points P2 and P4. Moreover, the prediction value of the prediction point P6 is derived with reference to the attribute data of the reference points P4 and P5. Then, for each of the prediction points P1, P3, and P6, a difference value between the prediction value calculated as described above and the attribute data is derived.

As illustrated in C of FIG. 2, in a layer one level higher than that, classification (sorting) is performed on points (P0, P2, P4, and P5) selected as reference points in a layer (a layer one level lower) in B of FIG. 2, a prediction value of each prediction point is derived, and a difference value between the prediction value and attribute data is derived.

By recursively repeating such classification on reference points of a layer one level lower, the reference structure of the attribute data is layered.

<Classification of Points>

A procedure of classifying (sorting) points in such lifting will be described more specifically. In lifting, points are classified in order from a lower layer toward an upper layer as described above. In each layer, first, points are aligned in order of Morton code. Next, a foremost point in a row of the points arranged in the order of the Morton code is selected as a reference point. Next, a point (a nearby point) located near the reference point is searched, and the searched point (the nearby point) is set as a prediction point (also referred to as an index point).

Figure 3:
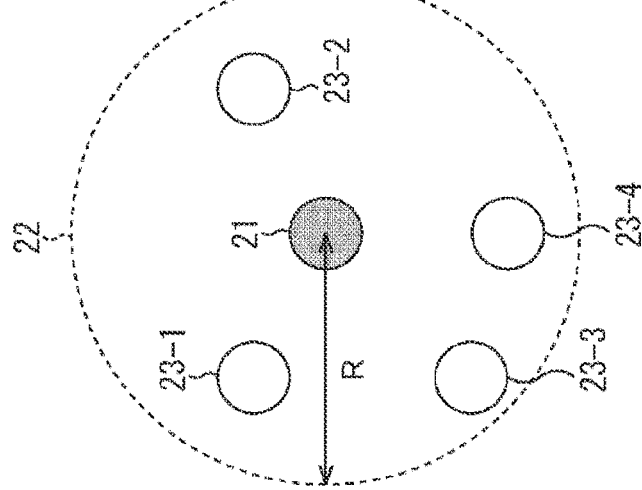
FIG. 3 is a view for explaining an example of Lifting.

For example, as illustrated in FIG. 3, a point is searched in a circle 22 having a radius R with a processing target reference point 21 as a center. This radius R is set in advance for each layer. In a case of the example of FIG. 3, points 23-1 to 23-4 are detected and set as prediction points.

Note that, in FIG. 3, a three-dimensional space is described as a two-dimensional plane for simplification of description. That is, in practice, each point is arranged in a three-dimensional space, and the point is searched in a spherical region having the radius R.

Next, similar classification is performed for the remaining points. That is, among points not currently selected as the reference point or the prediction point, a foremost point is selected as the reference point in the order of the Morton code, and a point near the reference point is searched and set as the prediction point.

When the above processing is repeated until all the points are classified, the processing of the layer is ended, and the processing target is moved to a layer one level higher. Then, the above-described procedure is repeated for the layer. That is, individual points selected as the reference points in the layer one level lower are aligned in order of the Morton code, and classified into the reference point and the prediction point as described above. By repeating the above processing, the reference structure of the attribute data is layered.

<Derivation of Prediction Value>

Furthermore, in the case of lifting as described above, a prediction value of attribute data of a prediction point is derived using attribute data of a reference point around the prediction point. For example, as illustrated in FIG. 4, it is assumed that a prediction value of a prediction point Q (i, j) is derived with reference to attribute data of reference points P1 to P3.

Figure 4:
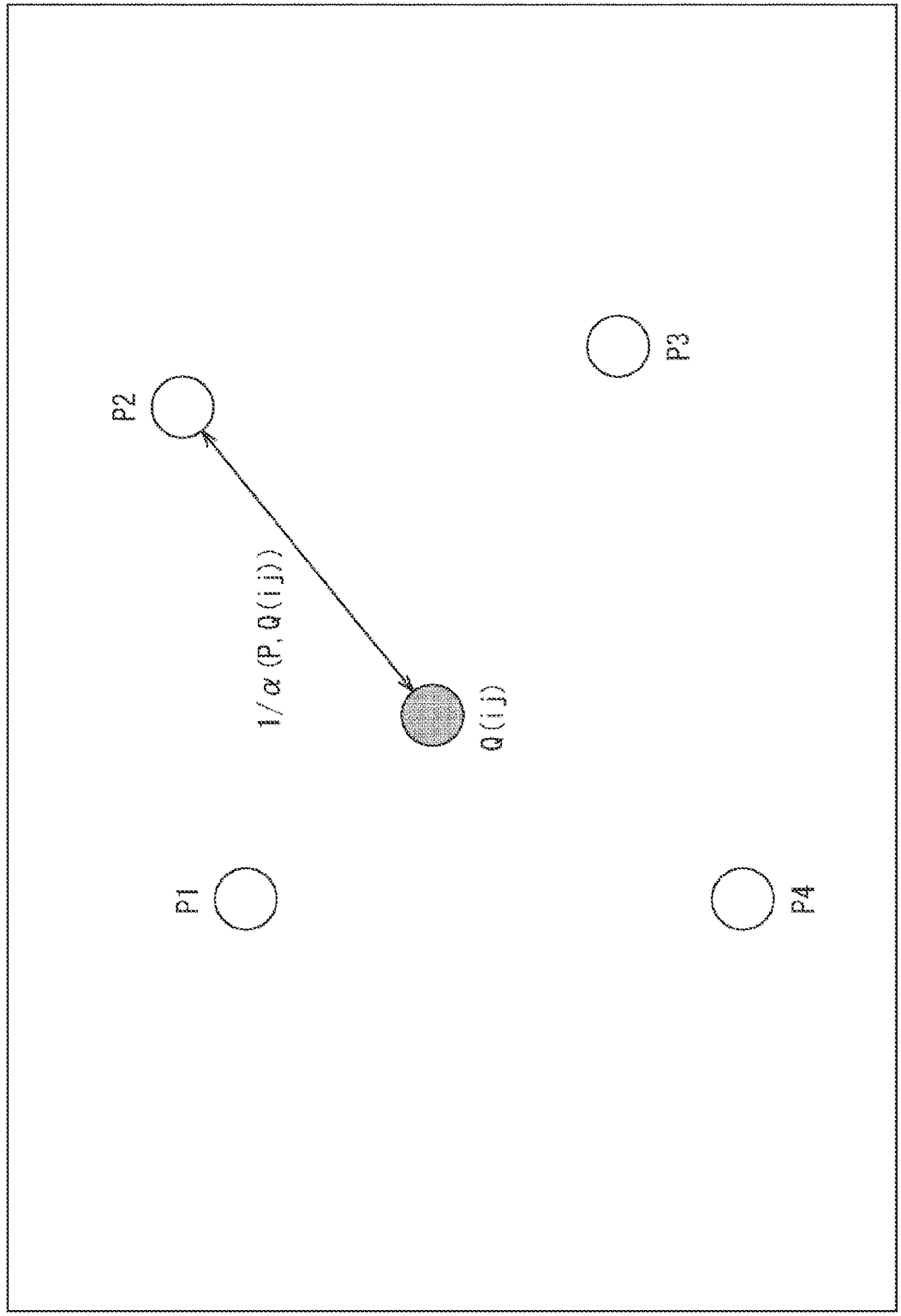
FIG. 4 is a view for explaining an example of Lifting.

Note that, in FIG. 4, a three-dimensional space is described as a two-dimensional plane for simplification of description. That is, in practice, each point is arranged in a three-dimensional space.

In this case, as shown in Equation (1) below, attribute data of each reference point is weighted by a weight value (α (P, Q (i, j))) corresponding to a reciprocal of a distance between the prediction point and the reference point (practically, a distance in a three-dimensional space), and integrated and derived. Here, A(P) indicates attribute data of a point P.

[Formula 1]

$$Pred(Q(i, j)) = \sum_{P \in \overline{V}(Q(i,j))} \alpha(P, Q(i, j)) A(P) \quad (1)$$

In the method described in Non Patent Document 4, position information of a highest resolution (that is, a lowermost layer) is used to derive a distance between the prediction point and the reference point.

<Quantization>

Figure 5:
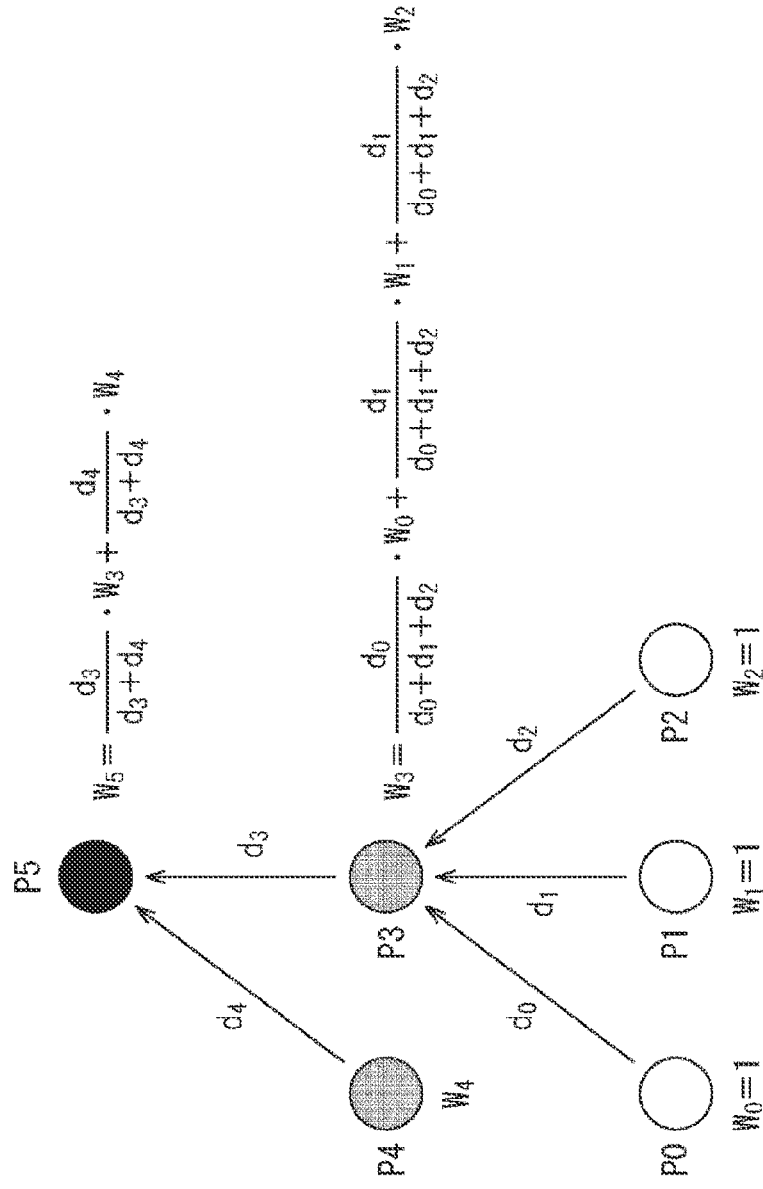
FIG. 5 is a view for explaining an example of quantization.

Furthermore, the attribute data is layered as described above, and then quantized and encoded. At a time of the quantization, attribute data (a difference value) of each point is weighted as shown in the example of FIG. 5 in accordance with the layered structure. As illustrated in FIG. 5, this weight value (a quantization weight) W is derived for each point by using a weight value of a lower layer. Note that this weight value can also be used in lifting (layering of attribute data) in order to improve compression efficiency.

<Mismatch in Tree Structure>

In a case of the lifting described in Non Patent Document 4, as described above, a method of layering of a reference structure of attribute data is different from a case of making a tree structure (for example, making an octree) of geometry data. Therefore, it is not guaranteed that the reference structure of the attribute data matches the tree structure of the geometry data. Therefore, in order to decode the attribute data, it has been necessary to decode the geometry data up to the lowermost layer regardless of the layer. That is, it has been difficult to achieve scalable decoding of point cloud data without decoding unnecessary information.

<Achievement of Scalable Decoding of Point Cloud Data>

Therefore, as described in Non Patent Document 2, a method has been proposed in which a reference structure of attribute data is made similar to a tree structure of geometry data. More specifically, when the reference structure of the attribute data is constructed, a prediction point is selected such that a point also exists in a voxel in a layer one level higher than layer to which a voxel having a point in a current layer belongs. By doing in this way, the point cloud data can be decoded at a desired resolution without decoding of unnecessary information. Namely, scalable decoding of point cloud data can be achieved.

Figure 6:
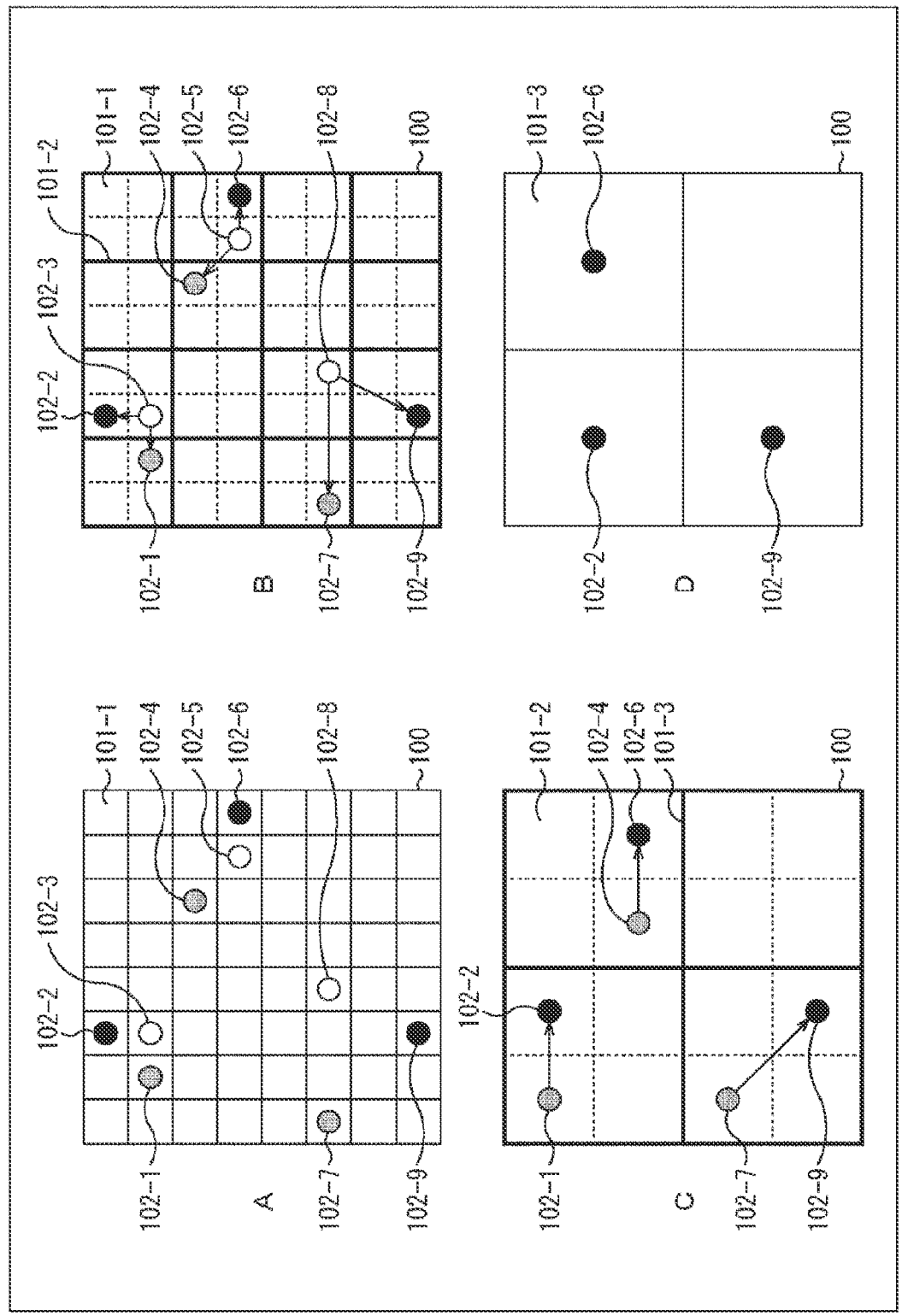
FIG. 6 is a view for explaining an example of layering of attribute data.

For example, as illustrated in A of FIG. 6, it is assumed that points 102-1 to 102-9 are arranged for the individual voxels 101-1 in a predetermined layer, in a bounding box 100 that is a predetermined three-dimensional space region. Note that, in FIG. 6, a three-dimensional space is described as a two-dimensional plane for simplification of description. That is, in practice, the bounding box is a three-dimensional space region, and the voxel is a small region of a rectangular parallelepiped (including a cube). The points are arranged in the three-dimensional space.

Note that voxels 101-1 to 101-3 will be referred to as a voxel 101 when it is not necessary to distinguish from one another for explanation. Furthermore, the points 102-1 to 102-9 will be referred to as a point 102 when it is not necessary to distinguish from one another for explanation.

In this layer, as illustrated in B of FIG. 6, the points 102-1 to 102-9 are classified into prediction points and reference points such that a point also exists in the voxel 101-2 in a layer one level higher than voxels 101-1 in which the point 102-1 to the point 102-9 exist. In the example in B of FIG. 6, points 102-3, 102-5, and 102-8 indicated by white circles are set as prediction points, and other points are set as reference points.

Similarly, also in a layer one level higher, the points 102 are classified into prediction points and reference points (C of FIG. 6) such that a point exists in the voxel 101-3 in the layer one level higher than the voxels 101-2 in which the points 102-1, 102-2, 102-4, 102-6, 102-7, and 102-9 exist. In the example in C of FIG. 6, the points 102-1, 102-4, and 102-7 indicated by gray circles are set as prediction points, and other points are set as reference points.

By doing in this way, as illustrated in D of FIG. 6, layering is performed such that one point 102 exists in the voxel 101-3 in which the point 102 exists in the lower layer. Such processing is performed for each layer. That is, by performing such processing when constructing a reference structure of attribute data (when classifying a prediction point and a reference point in each layer), the reference structure of the attribute data can be made similar to the tree structure (the octree) of the geometry data.

Figure 7:
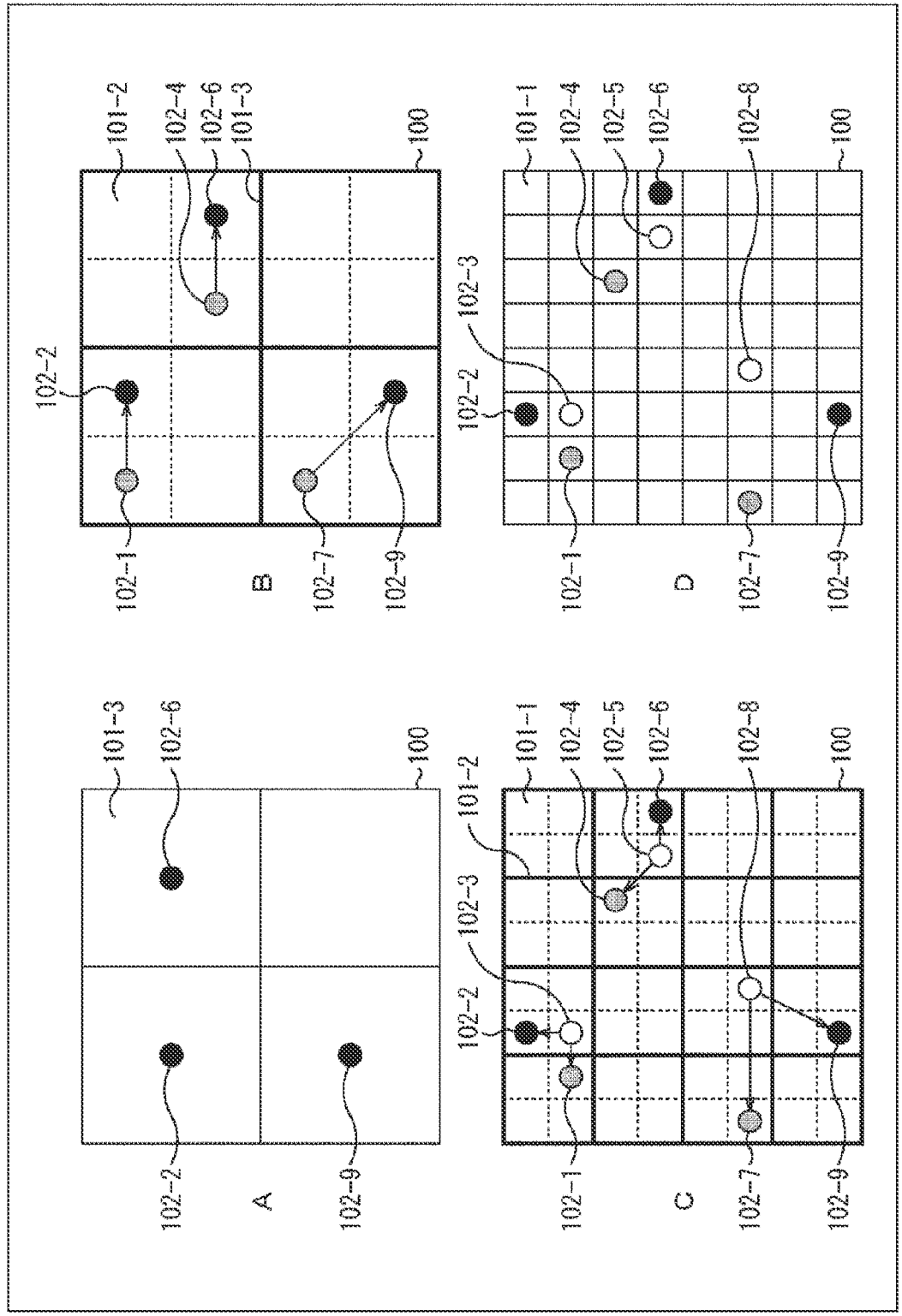
FIG. 7 is a view for explaining an example of reverse layering of attribute data.

Decoding is performed in a reverse order of FIG. 6, for example, as illustrated in FIG. 7. For example, as illustrated in A of FIG. 7, it is assumed that the points 102-2, 102-6, and 102-9 are arranged for the individual voxels 101-3 in a predetermined layer in a predetermined bounding box 100 (a state similar to D of FIG. 6). Note that, also in FIG. 7, a three-dimensional space is described as a two-dimensional plane for simplification of description. That is, in practice, the bounding box is a three-dimensional space region, and the voxel is a small region of a rectangular parallelepiped (including a cube). The points are arranged in the three-dimensional space.

As illustrated in B of FIG. 6, in a layer one level lower than that, by using attribute data of the points 102-2, 102-6, and 102-9 for the individual voxels 101-3, prediction values of the points 102-1, 102-4, and 102-7 are derived and added to a difference value, and attribute data of the point 102 for each voxel 101-2 is restored (a state similar to C of FIG. 6).

Moreover, similarly, also in a layer one level lower, as illustrated in C of FIG. 7, by using attribute data of the points 102-1, 102-2, 102-4, 102-6, 102-7, and 102-9 for the individual voxels 101-2, prediction values of the points 102-3, 102-5, and 102-8 are derived and added to a difference value, and attribute data is restored (a state similar to B of FIG. 6).

By doing in this way, as illustrated in D of FIG. 7, the attribute data of the point 102 for each voxel 101-1 is restored (a state similar to A of FIG. 6). That is, similarly to a case of the octree, attribute data of each layer can be restored using attribute data of a higher layer.

By doing in this way, a reference structure (a layered structure) of attribute data can be made correspond to a tree structure (a layered structure) of geometry data. Therefore, since geometry data corresponding to each piece of attribute data is obtained also at an intermediate resolution, the geometry data and the attribute data can be correctly decoded at the intermediate resolution. That is, scalable decoding of point cloud data can be achieved.

<Geometry Scaling>

Meanwhile, as described in Non Patent Document 3, a method called geometry scaling for scaling geometry data and thinning points at a time of encoding of a point cloud has been proposed. In the geometry scaling, geometry data of nodes is quantized at a time of encoding. By this processing, points can be thinned out in addition to characteristics of a region to be encoded.

For example, as illustrated in A of FIG. 8, six points (point1 to point6) respectively having X coordinates of 100, 101, 102, 103, 104, and 105 are set as processing targets. Note that, here, in order to simplify the description, only the X coordinate will be described. That is, since the points are actually arranged in a three-dimensional space, processing similar to that in a case of the X coordinate described below is also performed for a Y coordinate and a Z coordinate.

When the geometry scaling is applied to such six points, scaling of the X coordinate of each point is performed in accordance with a value of a quantization parameter baseQP as illustrated in a table in B of FIG. 8. In a case of baseQP=0, scaling is not performed, and thus the X coordinate of each point remains as a coordinate illustrated in A of FIG. 8. For example, in a case of baseQP=4, the X coordinate of point2 is scaled from 101 to 102, the X coordinate of point4 is scaled from 103 to 104, and the X coordinate of point6 is scaled from 105 to 106.

When the X coordinates of a plurality of points are superimposed by this scaling, merging can be performed. For example, in a case of mergeDuplicatePoint=1, such overlapping points are merged into one point. The mergeDuplicatePoint is flag information indicating whether or not to merge such overlapping points. That is, points are thinned out (the number of points is reduced) by such merging. For example, in each row of the table in B of FIG. 8, points indicated in gray can be thinned out by such merging. For example, in a case of baseQP=4, the number of points is reduced to ½ for four points (point2 to point5) indicated by thick lines.

When attribute data is layered as described in Non Patent Document 2 in order to achieve scalable decoding of point cloud data, a tree structure of geometry data is estimated on the basis of a decoded result of coded data of the geometry data. That is, a reference structure of the attribute data is formed so as to be similar to the estimated tree structure of the geometry data.

<Mismatch in Tree Structure Due to Geometry Scaling>

However, when the geometry scaling is applied as described above, there is a possibility that points have been thinned out in a decoded result of coded data of geometry data. When points have been thinned out, it may not be possible to estimate an actual tree structure of geometry data. That is, there is a possibility that a mismatch occurs between an estimation result of the tree structure and the actual tree structure (a tree structure corresponding to points before being thinned out). In such a case, there has been a possibility that scalable decoding of point cloud data cannot be achieved.

Figure 9:
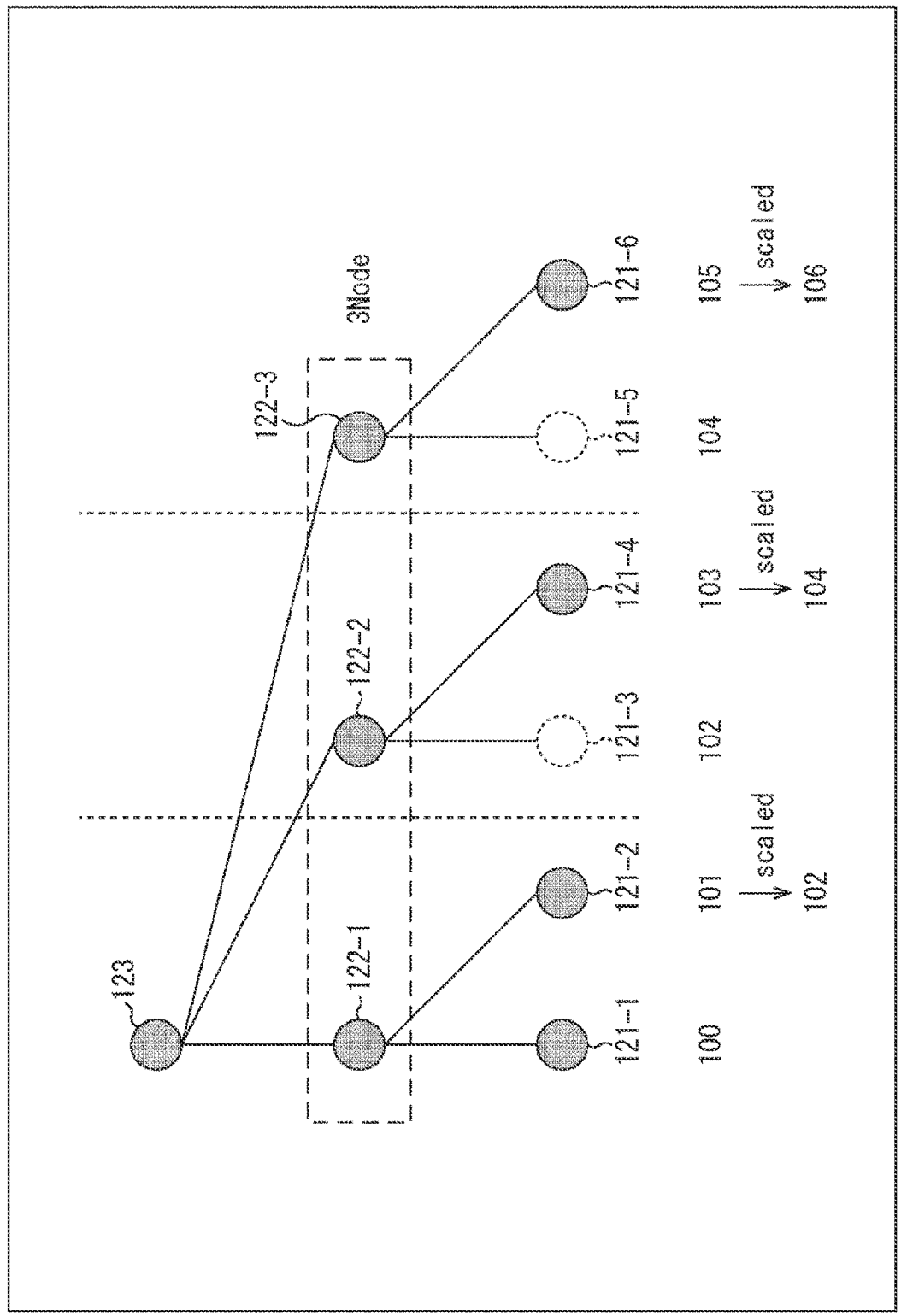
FIG. 9 is a view for explaining an example of geometry scaling.

A case where baseQP=4 in B of FIG. 8 will be described as an example. It is assumed that a tree structure corresponding to each point (point1 to point6) in the table illustrated in A of FIG. 8 is a tree structure as illustrated in FIG. 9. Nodes 121-1 to 121-6 of this tree structure correspond to individual points (point1 to point6) in a table illustrated in A of FIG. 8. That is, it is assumed that the X coordinates of the nodes 121-1 to 121-6 in a lowermost layer (a third layer) of the tree structure are 100, 101, 102, 103, 104, and 105, respectively.

In the tree structure of FIG. 9, the following two rules are applied. The first rule is that, in a layer (a second layer) one level higher than the third layer, a node with the X coordinate of 100 and a node with the X coordinate of 101, a node with the X coordinate of 102 and a node with the X coordinate of 103, and a node with the X coordinate of 104 and a node with the X coordinate of 105 in the third layer are individually grouped. The second rule is that all nodes in the second layer are grouped in an uppermost layer (a first layer).

That is, the nodes 121-1 and 121-2 of the third layer belong to a node 122-1 of the second layer. The nodes 121-3 and 121-4 of the third layer belong to a node 122-2 of the second layer. The nodes 121-5 and 121-6 of the third layer belong to a node 122-3 of the second layer. Furthermore, the nodes 122-1 to 122-3 of the second layer belong to a node 123 of the first layer.

Once the geometry scaling is performed, the X coordinate of the node 121-2 is scaled from 101 to 102, the X coordinate of the node 121-4 is scaled from 103 to 104, and the X coordinate of the node 121-6 is scaled from 105 to 106. As a result, since the X coordinates of the nodes 121-2 and 121-3 overlap with each other, merging is performed, and the node 121-3 is thinned out. Similarly, the nodes 121-4 and 121-5 are merged, and the node 121-5 is thinned out. As a result, in the third layer, the nodes 121-1, 121-2, 121-4, and 121-6 are encoded.

In encoding of attribute data, geometry data with a highest resolution is obtained as a decoded result of coded data of geometry data. That is, in a case of the example of FIG. 9, the nodes 121-1, 121-2, 121-4, and 121-6 are obtained. Then, a tree structure of the geometry data is estimated from these four points (four nodes).

In this case, a rule similar to that in the example of FIG. 9 is applied in order to form a similar tree structure. That is, in a layer (a second layer) one level higher than a third layer, a node with the X coordinate of 100 and a node with the X coordinate of 101, a node with the X coordinate of 102 and a node with the X coordinate of 103, and a node with the X coordinate of 104 and a node with the X coordinate of 105 in the third layer are individually grouped. Furthermore, all nodes in the second layer are grouped in an uppermost layer (a first layer).

Figure 10:
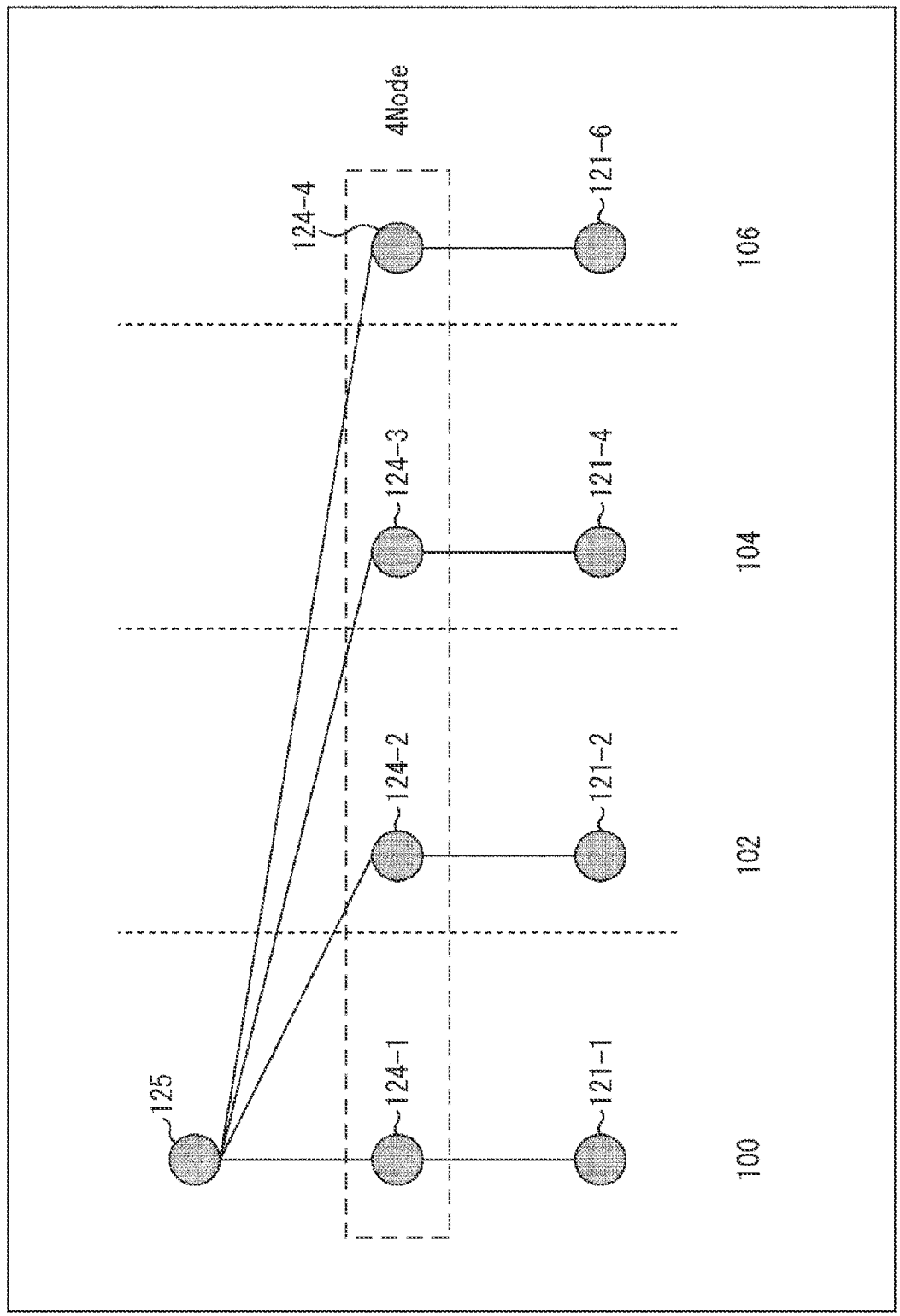
FIG. 10 is a view for explaining an example of layering of attribute data.

As a result, a tree structure as illustrated in FIG. 10 is estimated. That is, the node 121-1 of the third layer belongs to the node 124-1 of the second layer. The third layer node 121-2 belongs to the second layer node 124-2. The third layer node 121-4 belongs to the second layer node 124-3. The third layer node 121-6 belongs to the second layer node 124-4. Furthermore, the nodes 124-1 to 124-4 of the second layer belong to a node 125 of the first layer.

As is apparent from comparison between FIG. 9 and FIG. 10, these tree structures do not match. For example, a value of a parameter skipOctreeLayer indicating a layer to be decoded is assumed to be "1" (skipOctreeLayer=1). That is, when the second layer is decoded, three nodes are obtained in geometry data as illustrated in FIG. 9. On the other hand, as illustrated in FIG. 10, four nodes are obtained in attribute data. As described above, since the tree structures do not match, it has been difficult to obtain a decoded result of a desired layer without decoding unnecessary information. That is, it has been difficult to achieve scalable point cloud data.

In other words, in order to achieve scalable decoding of point cloud data, it is necessary to estimate a tree structure in consideration of such geometry scaling. That is, complicated processing has been required, such as changing a method of estimating a tree structure between a case where the geometry scaling is performed and a case where the geometry scaling is not performed. Furthermore, preparing a plurality of estimation methods may have increased the cost.

Furthermore, in the geometry scaling, a way of thinning out (which point among a plurality of overlapping points is to be thinned out) when overlapping points are thinned out is not specified and depends on a design. That is, the method for estimating a tree structure corresponding to the geometry scaling needs to be newly designed in accordance with a design of the geometry scaling, which may have increased the cost.

<Limitation of Encoding Method>

Therefore, as described in the top row of a table illustrated in FIG. 11, an applicable encoding method is limited, and combined use of scalable decodable encoding and a process of updating a tree structure of geometry data is prohibited.

That is, in encoding of a point cloud representing an object having a three-dimensional shape as a set of points, control is performed so as to prohibit combined use of scalable encoding that is an encoding method for generating scalably decodable coded data and scaling encoding that is an encoding method involving a change in a tree structure of geometry data.

For example, in encoding of a point cloud representing an object having a three-dimensional shape as a set of points in an information processing apparatus, there is provided an encoding control unit configured to perform control so as to prohibit combined use of scalable encoding that is an encoding method for generating scalably decodable coded data and scaling encoding that is an encoding method involving a change in a tree structure of geometry data.

That is, application of the scaling encoding is prohibited when the scalable encoding is applied, and application of the scalable encoding is prohibited when the scaling encoding is applied. By doing in this way, in a case of performing the scalable encoding, it is possible to suppress occurrence of a mismatch between a reference structure of attribute data and a tree structure of geometry data. Therefore, scalable decoding of point cloud data can be more easily achieved.

Note that the scalable encoding may be performed by any method as long as the method is an encoding method for generating coded data that is scalably decodable. For example, lifting scalability may be adopted in which attribute data is encoded by lifting with a reference structure similar to a tree structure of geometry data, as described in Non Patent Document 2. That is, encoding may be controlled so as to prohibit combined use of the lifting scalability and the scaling encoding.

Furthermore, the scaling encoding may be performed by any method as long as the encoding method involves a change in a tree structure of geometry data. For example, geometry scaling that scales and encodes geometry data as described in Non Patent Document 3 may be used. That is, control may be performed to prohibit combined use of the scalable encoding and the geometry scaling.

Of course, as described in the second row from the top of the table illustrated in FIG. 11, combined use of the lifting scalability and the geometry scaling may be prohibited (Method 1).

At that time, the encoding control unit may perform control to prohibit application of the scaling encoding when the scalable encoding is applied. For example, as described in the third row from the top of the table illustrated in FIG. 11, application of the geometry scaling may be prohibited when the lifting scalability is applied (Method 1-1).

Furthermore, the encoding control unit may perform control to prohibit application of the scalable encoding when the scaling encoding is applied. For example, as described in the fourth row from the top of the table illustrated in FIG. 11, application of the lifting scalability may be prohibited when the geometry scaling is applied (Method 1-2).

Furthermore, in order to perform such control, for example, as described in the fifth row from the top of the table illustrated in FIG. 11, flag information (a permission flag or a prohibition flag) indicating whether or not to permit (or whether or not to prohibit) application of the scalable encoding and the scaling encoding may be set (Method 2).

For example, the encoding control unit may control signaling of a scalable encoding enabled flag that is flag information regarding application of the scalable encoding and a scaling encoding enabled flag that is flag information regarding application of the scaling encoding.

For example, as described in the sixth row from the top of the table illustrated in FIG. 11, such restriction may be specified in semantics (Method 2-1). For example, in semantics, it may be specified that a scaling encoding enabled flag of a value indicating non-application of the scaling encoding is signaled when a scalable encoding enabled flag of a value indicating application of the scalable encoding is signaled, and the encoding control unit may perform signaling in accordance with the semantics. Furthermore, in the semantics, it may be specified that a scalable encoding enabled flag of a value indicating non-application of the scalable encoding is signaled when a scaling encoding enabled flag of a value indicating application of the scaling encoding is signaled, and the encoding control unit may perform signaling in accordance with the semantics.

FIG. 12 illustrates an example of semantics in that case. For example, in semantics 161 illustrated in FIG. 12, it is specified that a value of lifting_scalability_enabled_flag needs to be set to 0 when a value of geom_scaling_enabled_flag is greater than 0. Here, geom_scaling_enabled_flag is flag information indicating whether or not to apply the geometry scaling. In a case of geom_scaling_enabled_flag=1, the geometry scaling is applied. Furthermore, in a case of geom_scaling_enabled_flag=0, the geometry scaling is not applied. lifting_scalability_enabled_flag is flag information indicating whether or not to apply the lifting scalability. When lifting_scalability_enabled_flag=1, the lifting scalability is applied. Furthermore, when lifting_scalability_enabled_flag=0, the lifting scalability is not applied.

That is, in the semantics 161, application of the lifting scalability is prohibited when the geometry scaling is applied. Note that, conversely, application of the geometry scaling may be prohibited when the lifting scalability is applied, in the semantics. That is, in the semantics, it may be specified that a value of geom_scaling_enabled_flag needs to be set to 0 when a value of lifting_scalability_enabled_flag is greater than 0.

Furthermore, for example, as described in the seventh row from the top of the table illustrated in FIG. 11, signaling based on such limitation may be performed in a profile (Method 2-2). For example, when the scalable encoding is applied, the encoding control unit may perform control to signal, in the profile, a scalable encoding enabled flag of a value indicating application of the scalable encoding and a scaling encoding enabled flag of a value indicating non-application of the scaling encoding. Furthermore, when the scaling encoding is applied, the encoding control unit may perform control to signal, in the profile, a scaling encoding enabled flag of a value indicating application of the scaling encoding and a scalable encoding enabled flag of a value indicating non-application of the scalable encoding.

Figure 13:
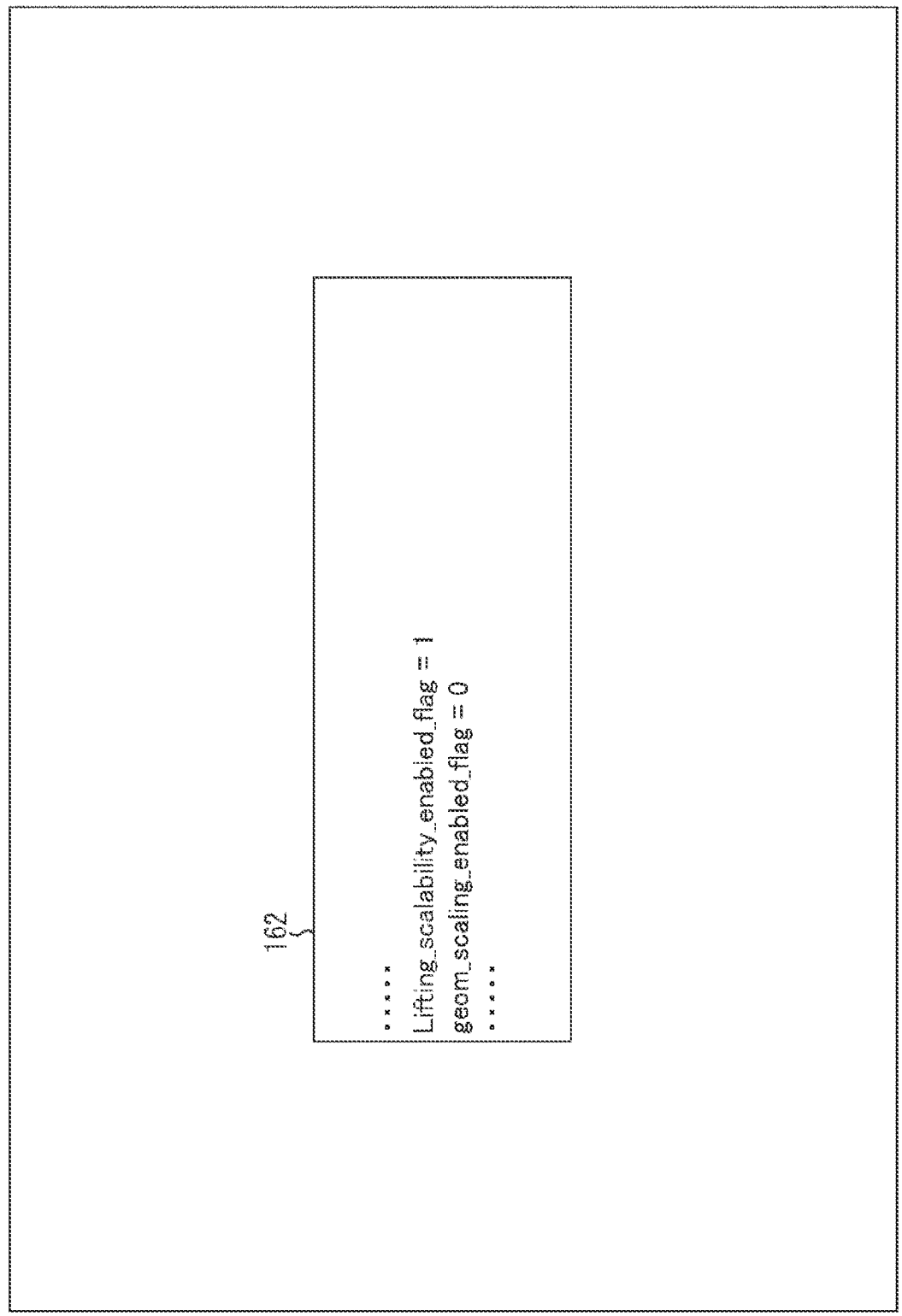
FIG. 13 is a view for explaining an example of a profile.

FIG. 13 illustrates an example of a profile when the lifting scalability is applied. For example, in a profile 162 illustrated in FIG. 13, lifting_scalability_enabled_flag=1 and geom_scaling_enabled_flag=0 are signaled. That is, the profile 162 indicates that the lifting scalability is applied and the geometry scaling is not applied.

Note that, in a profile when the geometry scaling is applied, geom_scaling_enabled_flag=1 and lifting_scalability_enabled_flag=0 may be signaled.

Moreover, for example, as described in the bottom row of the table illustrated in FIG. 11, such a limitation may be specified in syntax (Method 2-3). For example, the encoding control unit may perform control to omit signaling of a scaling encoding enabled flag in accordance with the syntax as described above, in a case of signaling a scalable encoding enabled flag of a value indicating application of the scalable encoding. Furthermore, the encoding control unit may perform control to omit signaling of a scalable encoding enabled flag in accordance with the syntax as described above, in a case of signaling a scaling encoding enabled flag of a value indicating application of the scaling encoding.

FIG. 14 illustrates an example of syntax in this case. For example, in syntax 163 illustrated in FIG. 14, lifting_scalability_enabled_flag is signaled only when geom_scaling_enabled_flag is not signaled (that is, when a value is set to "0" and the geometry scaling is not applied). That is, in this case, the lifting scalability can be applied. In other words, when the geometry scaling is applicable (that is, when geom_scaling_enabled_flag is signaled), lifting_scalability_enabled_flag is not signaled (that is, a value is set to "0", and the lifting scalability is not applied).

Note that, conversely, geom_scaling_enabled_flag may be signaled only when signaling lifting_scalability_enabled_flag is not signaled (that is, when a value is set to "0" and the lifting scalability is not applied). That is, in this case, the geometry scaling can be applied. In other words, geom_scaling_enabled_flag may not be signaled (that is, a value is set to "0", and the geometry scaling is not applied) when the lifting scalability is applicable (that is, when the lifting_scalability_enabled_flag is signaled).

2. First Embodiment

<Encoding Device>

Figure 15:
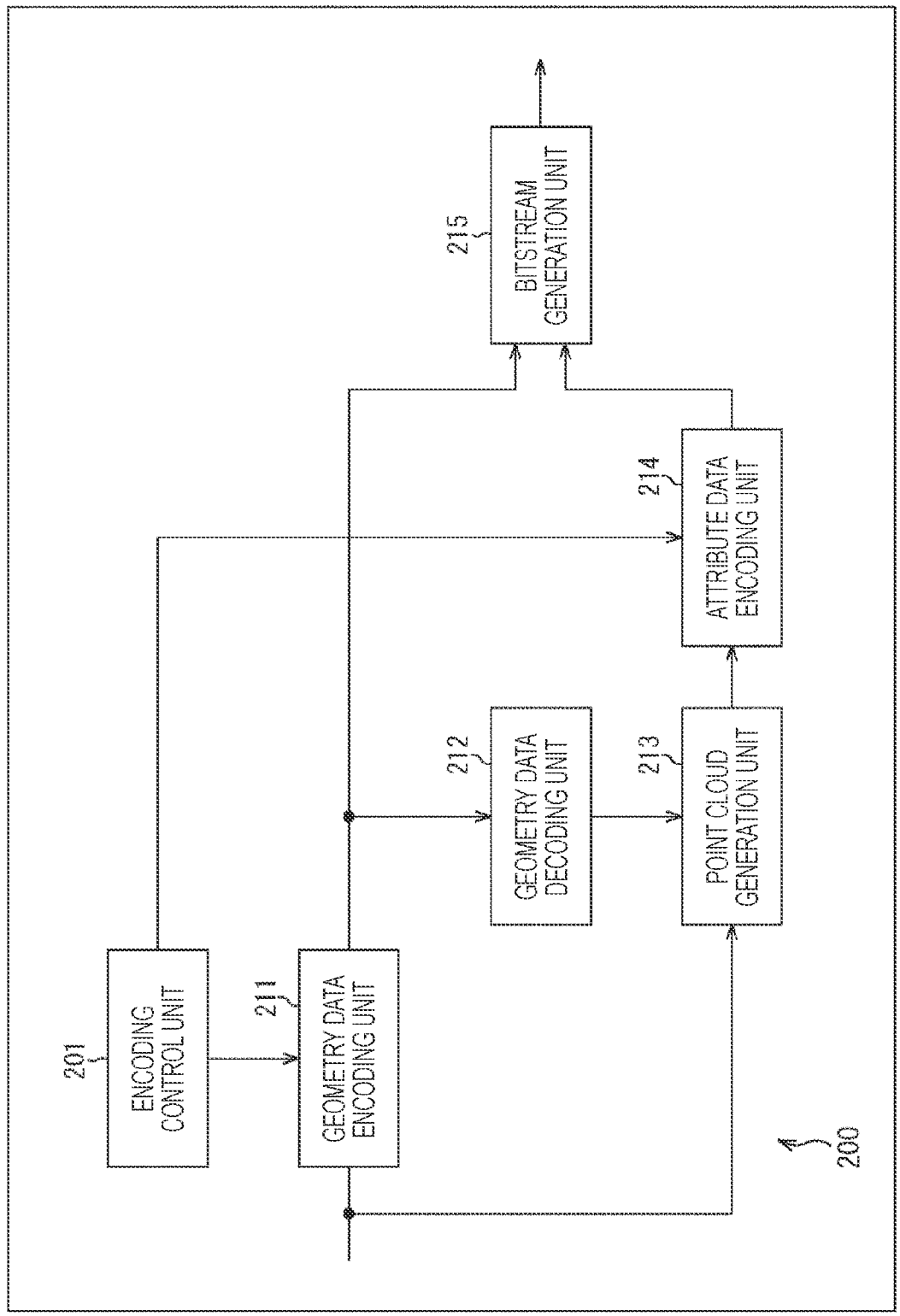
FIG. 15 is a block diagram illustrating a main configuration example of an encoding device.

Next, an apparatus to which the present technology described above in <1. Encoding control> is applied will be described. FIG. 15 is a block diagram illustrating an example of a configuration of an encoding device, which is one aspect of an information processing apparatus to which the present technology is applied. An encoding device 200 illustrated in FIG. 15 is a device that encodes a point cloud (3D data). The encoding device 200 encodes a point cloud by applying the present technology described above in <1. Encoding control>.

Note that, in FIG. 15, main parts of processing units, data flows, and the like are illustrated, and those illustrated in FIG. 15 are not necessarily all. That is, in the encoding device 200, there may be a processing unit not illustrated as a block in FIG. 15, or there may be a flow of processing or data not illustrated as an arrow or the like in FIG. 15.

As illustrated in FIG. 15, the encoding device 200 includes an encoding control unit 201, a geometry data encoding unit 211, a geometry data decoding unit 212, a point cloud generation unit 213, an attribute data encoding unit 214, and a bitstream generation unit 215.

The encoding control unit 201 performs processing related to control of encoding of point cloud data. For example, the encoding control unit 201 controls the geometry data encoding unit 211. Furthermore, the encoding control unit 201 controls the attribute data encoding unit 214. For example, as described above in <1. Encoding control>, the encoding control unit 201 controls these processing units so as to prohibit combined use of scalable encoding that is an encoding method for generating scalably decodable coded data and scaling encoding that is an encoding method involving a change in a tree structure of geometry data. Furthermore, the encoding control unit 201 controls the bitstream generation unit 215 to control signaling of: a scalable encoding enabled flag (for example, Lifting_scalability_enabled_flag), which is flag information regarding application of the scalable encoding; and a scaling encoding enabled flag (for example, geom_scaling_enabled_flag), which is flag information regarding application of the scaling encoding.

The geometry data encoding unit 211 encodes geometry data (position information) of a point cloud (3D data) inputted to the encoding device 200, to generate coded data thereof. Any encoding method for this may be adopted. For example, processing such as filtering and quantization for noise suppression (denoising) may be performed. However, the geometry data encoding unit 211 performs this encoding under control of the encoding control unit 201. That is, in this encoding, the geometry data encoding unit 211 applies the geometry scaling under control of the encoding control unit 201. The geometry data encoding unit 211 supplies the generated coded data of the geometry data to the geometry data decoding unit 212 and the bitstream generation unit 215.

The geometry data decoding unit 212 acquires the coded data of the geometry data supplied from the geometry data encoding unit 211, and decodes the coded data. Any decoding method for this may be adopted as long as the method corresponds to encoding by the geometry data encoding unit 211. For example, processing such as filtering or inverse quantization for denoising may be performed. The geometry data decoding unit 212 supplies generated geometry data (a decoded result) to the point cloud generation unit 213.

The point cloud generation unit 213 acquires attribute data (attribute information) of a point cloud inputted to the encoding device 200 and the geometry data (the decoded result) supplied from the geometry data decoding unit 212. The point cloud generation unit 213 performs processing (a recoloring process) of making the attribute data correspond to the geometry data (the decoded result). The point cloud generation unit 213 supplies attribute data made correspond to the geometry data (the decoded result), to the attribute data encoding unit 214.

The attribute data encoding unit 214 acquires the geometry data (the decoded result) and the attribute data supplied from the point cloud generation unit 213. The attribute data encoding unit 214 encodes the attribute data by using the geometry data (the decoded result), to generate coded data of the attribute data. However, the attribute data encoding unit 214 performs this encoding under control of the encoding control unit 201. That is, the attribute data encoding unit 214 applies the lifting scalability in this encoding under control of the encoding control unit 201. The attribute data encoding unit 214 supplies the generated coded data of the attribute data to the bitstream generation unit 215.

The bitstream generation unit 215 acquires the coded data of the geometry data supplied from the geometry data encoding unit 211. Furthermore, the bitstream generation unit 215 acquires the coded data of the attribute data supplied from the attribute data encoding unit 214. The bitstream generation unit 215 generates a bitstream including the coded data. Furthermore, under control of the encoding control unit 201, the bitstream generation unit 215 performs signaling of control information (includes the control information in the bitstream) such as: a scalable encoding enabled flag (for example, Lifting_scalability_enabled_flag), which is flag information regarding application of the scalable encoding; and a scaling encoding enabled flag (for example, geom_scaling_enabled_flag), which is flag information regarding application of the scaling encoding. The bitstream generation unit 215 outputs the generated bitstream to outside the encoding device 200 (for example, a decoding side).

Such a configuration enables the encoding device 200 to prohibit combined use of scalable encoding that is an encoding method for generating scalably decodable coded data and scaling encoding that is an encoding method involving a change in a tree structure of geometry data, and scalable decoding of point cloud data can be more easily achieved.

Note that these processing units (the encoding control unit 201, the geometry data encoding unit 211 to the bitstream generation unit 215) have any configuration. For example, each processing unit may be configured by a logic circuit that implements the above-described processing. Furthermore, each processing unit may have, for example, a central processing unit (CPU), a read only memory (ROM), a random access memory (RAM), and the like, and execute a program by using them to implement the above-described processing. Of course, each processing unit may have both of the configurations, implement a part of the above-described processing by the logic circuit, and implement other by executing the program. The configurations of the processing units may be independent from each other and, for example, some processing units may implement a part of the above-described processing by the logic circuit, some other processing units may implement the above-described processing by executing the program, and still some other processing units may implement the above-described processing by both the logic circuit and the execution of the program.

<Geometry Data Encoding Unit>

Figure 16:
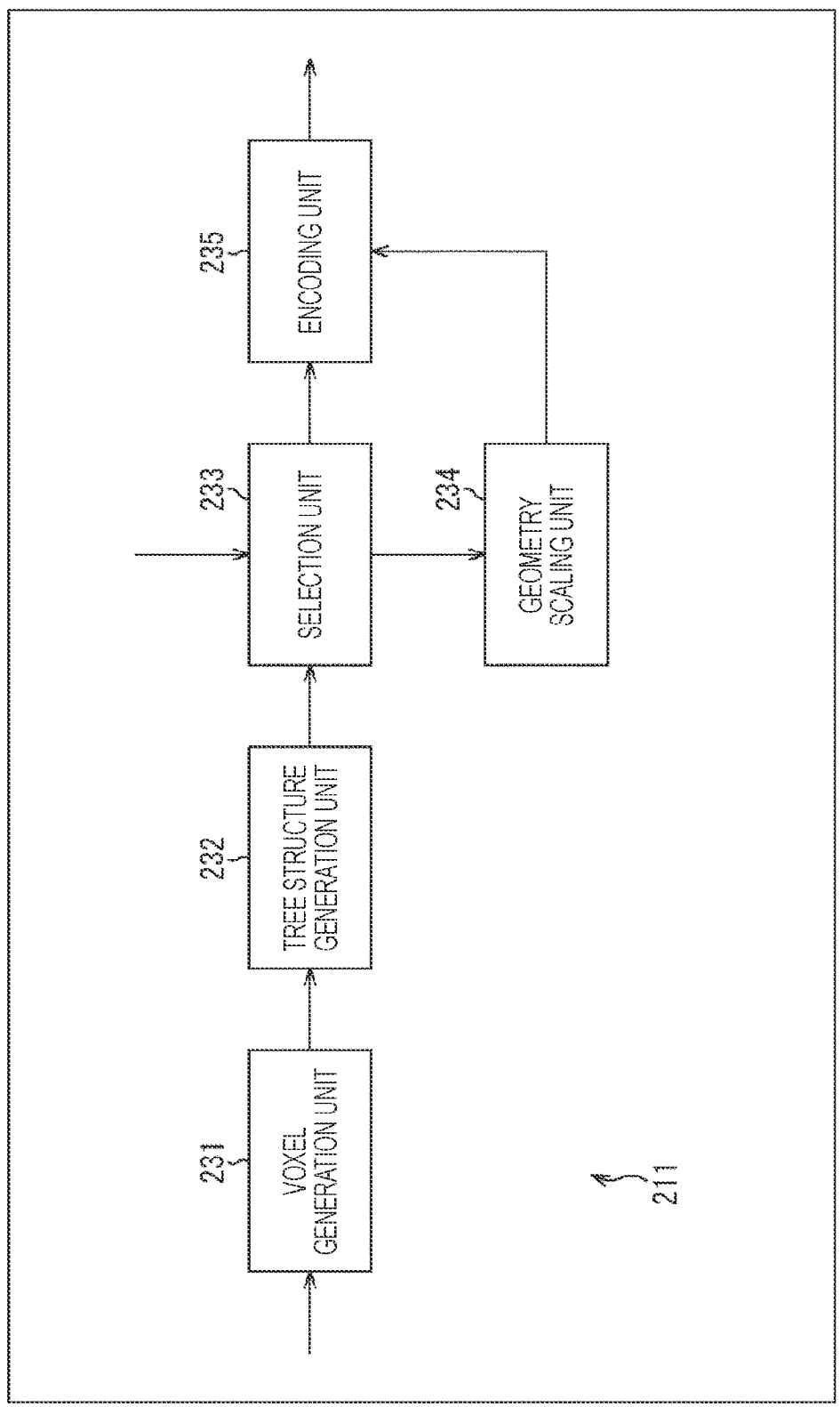
FIG. 16 is a block diagram illustrating a main configuration example of a geometry data encoding unit.

FIG. 16 is a block diagram illustrating a main configuration example of the geometry data encoding unit 211. Note that, in FIG. 16, main parts of processing units, data flows, and the like are illustrated, and those illustrated in FIG. 16 are not necessarily all. That is, in the geometry data encoding unit 211, there may be a processing unit not illustrated as a block in FIG. 16, or there may be a flow of processing or data not illustrated as an arrow or the like in FIG. 16.

As illustrated in FIG. 16, the geometry data encoding unit 211 includes a voxel generation unit 231, a tree structure generation unit 232, a selection unit 233, a geometry scaling unit 234, and an encoding unit 235.

The voxel generation unit 231 performs processing related to generation of voxel data. For example, the voxel generation unit 231 sets a bounding box for inputted point cloud data, and sets a voxel so as to segment the bounding box. Then, the voxel generation unit 231 quantizes geometry data of each point in units of a voxel, to generate voxel data. The voxel generation unit 231 supplies the generated voxel data to the tree structure generation unit 232.

The tree structure generation unit 232 performs processing related to generation of a tree structure. For example, the tree structure generation unit 232 acquires voxel data supplied from the voxel generation unit 231. Furthermore, the tree structure generation unit 232 makes a tree structure of the voxel data. For example, the tree structure generation unit 232 generates an octree by using the voxel data. The tree structure generation unit 232 supplies the generated octree data to the selection unit 233.

The selection unit 233 performs processing related to control of application/non-application of the geometry scaling. For example, the selection unit 233 acquires the octree data supplied from the tree structure generation unit 232. Furthermore, the selection unit 233 selects a supply destination of the octree data under control of the encoding control unit 201. Namely, the selection unit 233 selects whether to supply the octree data to the geometry scaling unit 234 or the encoding unit 235 under control of the encoding control unit 201, and supplies the octree data to the selected supply destination.

For example, when application of the geometry scaling is instructed by the encoding control unit 201, the selection unit 233 supplies the octree data to the geometry scaling unit 234. Furthermore, when non-application of the geometry scaling is instructed by the encoding control unit 201, the selection unit 233 supplies the octree data to the encoding unit 235.

The geometry scaling unit 234 performs processing related to the geometry scaling. For example, the geometry scaling unit 234 acquires the octree data supplied from the selection unit 233. Furthermore, the geometry scaling unit 234 performs the geometry scaling on the octree data, and performs scaling of geometry data and merging of points.

The geometry scaling unit 234 supplies the octree data subjected to the geometry scaling, to the encoding unit 235.

The encoding unit 235 performs processing related to encoding of octree data (voxel data made as an octree (that is, geometry data)). For example, the encoding unit 235 acquires the octree data supplied from the selection unit 233 or the geometry scaling unit 234. For example, when application of the geometry scaling is instructed by the encoding control unit 201, the encoding unit 235 acquires the octree data subjected to the geometry scaling and supplied from the geometry scaling unit. Furthermore, when non-application of the geometry scaling is instructed by the encoding control unit 201, the encoding unit 235 acquires the octree data not subjected to the geometry scaling and supplied from the selection unit 233.

The encoding unit 235 encodes the acquired octree data to generate coded data of geometry data. Any encoding method for this may be adopted. The encoding unit 235 supplies the generated coded data of the geometry data to the geometry data decoding unit 212 and the bitstream generation unit 215 (both in FIG. 15).

<Attribute Data Encoding Unit>

Figure 17:
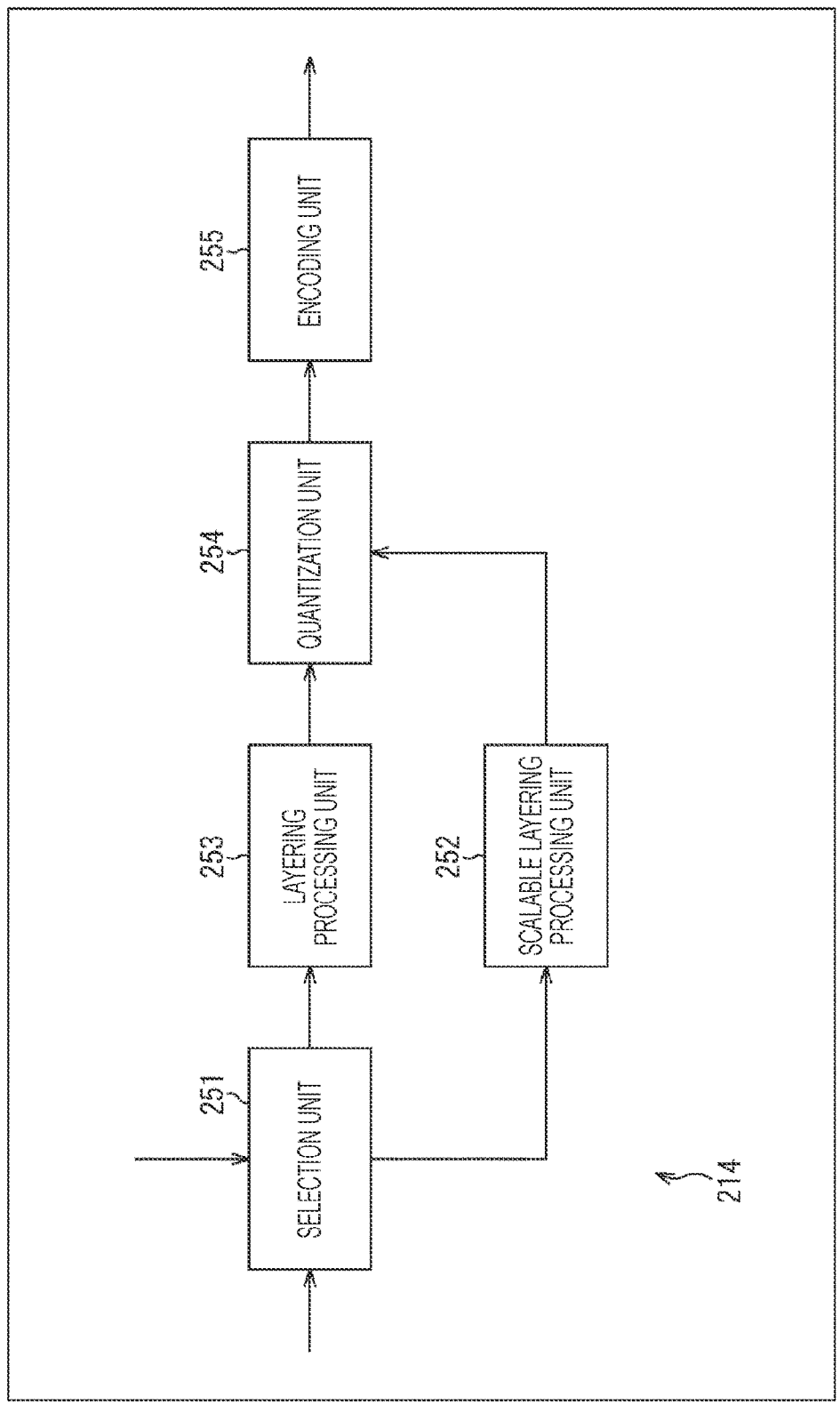
FIG. 17 is a block diagram illustrating a main configuration example of an attribute data encoding unit.

FIG. 17 is a block diagram illustrating a main configuration example of the attribute data encoding unit 214. Note that, in FIG. 17, main parts of processing units, data flows, and the like are illustrated, and those illustrated in FIG. 17 are not necessarily all. That is, in the attribute data encoding unit 214, there may be a processing unit not illustrated as a block in FIG. 17, or there may be a flow of processing or data not illustrated as an arrow or the like in FIG. 17.

As illustrated in FIG. 17, the attribute data encoding unit 214 includes a selection unit 251, a scalable layering processing unit 252, a layering processing unit 253, a quantization unit 254, and an encoding unit 255.

The selection unit 251 performs processing related to control of application/non-application of the lifting scalability. For example, the selection unit 251 selects a supply destination of attribute data, geometry data (a decoded result), and the like obtained by the point cloud generation unit 213 (FIG. 15) under control of the encoding control unit 201. Namely, the selection unit 251 selects whether to supply these pieces of data to the scalable layering processing unit 252 or to the layering processing unit 253 under control of the encoding control unit 201, and supplies these pieces of data to the selected supply destination.

For example, when application of the lifting scalability is instructed by the encoding control unit 201, the selection unit 251 supplies the attribute data, the geometry data (the decoded result), and the like to the scalable layering processing unit 252. Furthermore, when non-application of the lifting scalability is instructed by the encoding control unit 201, the selection unit 251 supplies the attribute data, the geometry data (the decoded result), and the like to the layering processing unit 253.

The scalable layering processing unit 252 performs processing related to lifting of attribute data (formation of a reference structure). For example, the scalable layering processing unit 252 acquires the attribute data and the geometry data (the decoded result) supplied from the selection unit 251. The scalable layering processing unit 252 layers the attribute data (that is, forms a reference structure) by using the geometry data. At that time, the scalable layering processing unit 252 performs layering by applying the method described in Non Patent Document 2. That is, the scalable layering processing unit 252 estimates a tree structure (an octree) on the basis of the geometry data, and forms a reference structure of the attribute data so as to correspond to the estimated tree structure, derives a prediction value in accordance with the reference structure, and derives a difference value between the prediction value and the attribute data. The scalable layering processing unit 252 supplies the attribute data (the difference value) generated in this manner to the quantization unit 254.

The layering processing unit 253 performs processing related to lifting of attribute data (formation of a reference structure). For example, the layering processing unit 253 acquires the attribute data and the geometry data (the decoded result) supplied from the selection unit 251. The layering processing unit 253 layers the attribute data (that is, forms a reference structure by using the geometry data). At that time, the layering processing unit 253 performs layering by applying the method described in Non Patent Document 4. That is, the layering processing unit 253 forms a reference structure of the attribute data independently of a tree structure (an octree) of the geometry data, derives a prediction value in accordance with the reference structure, and derives a difference value between the prediction value and the attribute data. That is, the layering processing unit 253 does not estimate the tree structure of the geometry data. The layering processing unit 253 supplies the attribute data (the difference value) generated in this manner, to the quantization unit 254.

The quantization unit 254 acquires the attribute data (the difference value) supplied from the scalable layering processing unit 252 or the layering processing unit 253. The quantization unit 254 quantizes the attribute data (the difference value). The quantization unit 254 supplies the quantized attribute data (difference value) to the encoding unit 255.

The encoding unit 255 acquires the quantized attribute data (difference value) supplied from the quantization unit 254. The encoding unit 255 encodes the quantized attribute data (difference value) to generate coded data of the attribute data. Any encoding method for this may be adopted. The encoding unit 255 supplies the generated coded data of the attribute data to the bitstream generation unit 215 (FIG. 15).

By having the configuration as described above, the encoding device 200 can prohibit combined use of scalable encoding that is an encoding method for generating scalably decodable coded data and scaling encoding that is an encoding method involving a change in a tree structure of geometry data, in encoding of a point cloud representing an object having a three-dimensional shape as a set of points. Therefore, it is possible to achieve scalable decoding of point cloud data without requiring complicated processing such as, for example, preparing a plurality of methods for estimating a tree structure of geometry data and selecting from among them, in encoding of the attribute data. Furthermore, since it is not necessary to newly design a method for estimating a tree structure, an increase in cost can be suppressed. Namely, scalable decoding of point cloud data can be more easily achieved.

<Flow of Encoding Control Process>

Figure 18:
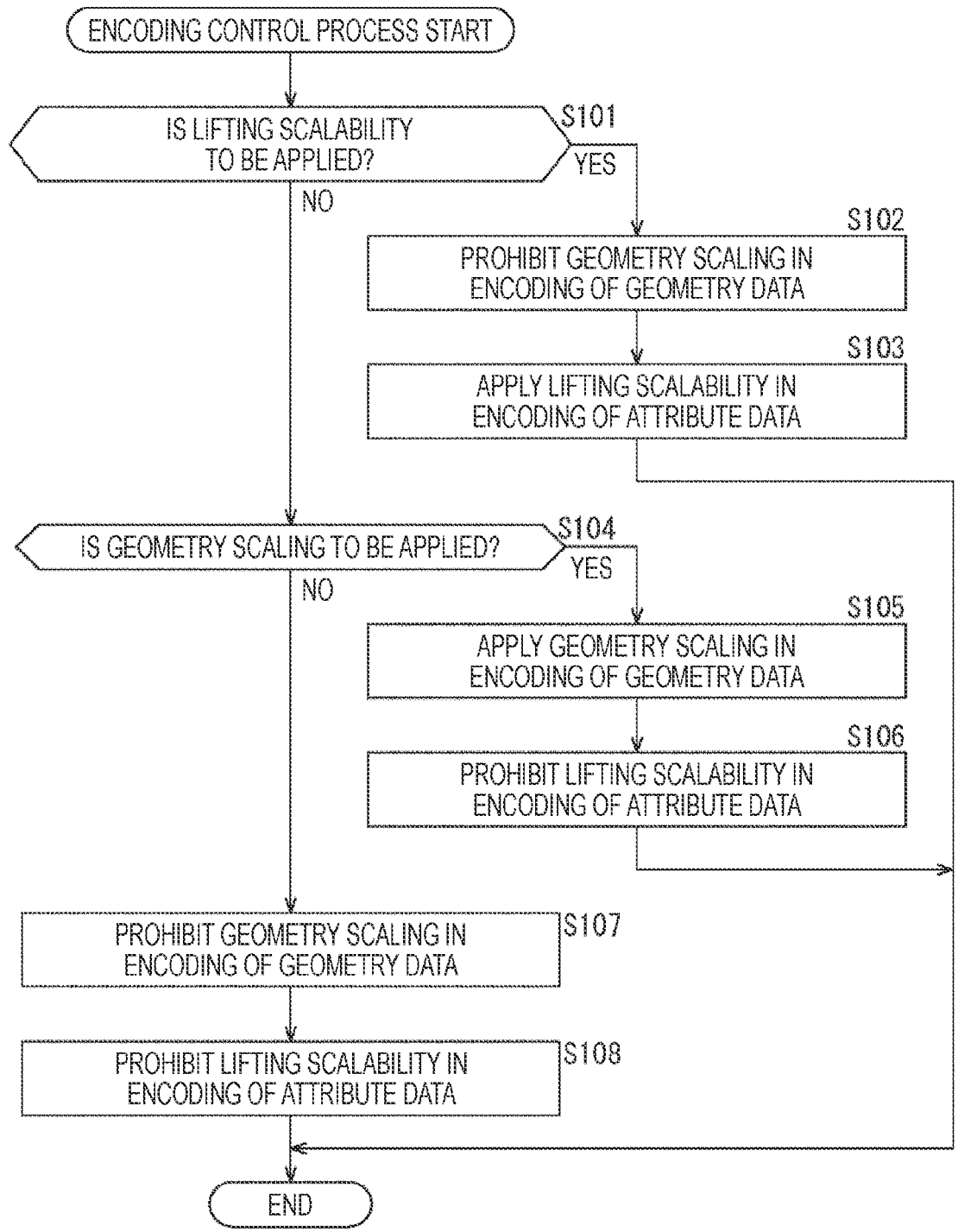
FIG. 18 is a flowchart illustrating an example of a flow of an encoding control process.

Next, processing executed by the encoding device 200 will be described. The encoding control unit 201 of the encoding device 200 controls encoding of data of a point cloud by executing an encoding control process. An example of a flow of this encoding control process will be described with reference to a flowchart of FIG. 18.

When the encoding control process is started, in step S101, the encoding control unit 201 determines whether or not to apply the lifting scalability. When it is determined to apply the lifting scalability, the process proceeds to step S102.

In step S102, the encoding control unit 201 prohibits the geometry scaling in encoding of geometry data. Furthermore, in step S103, the encoding control unit 201 applies the lifting scalability in encoding of attribute data. Furthermore, as described above in <1. Encoding control>, the encoding control unit 201 signals control information such as Lifting_scalability_enabled_flag and geom_scaling_enabled_flag so as to correspond to these controls.

When the process of step 3103 ends, the encoding control process ends.

Furthermore, when it is determined in step S101 not to apply the lifting scalability, the process proceeds to step S104.

In step S104, the encoding control unit 201 determines whether or not to apply the geometry scaling. When it is determined to apply the geometry scaling, the process proceeds to step S105.

In step S105, the encoding control unit 201 applies the geometry scaling in encoding of geometry data. Furthermore, in step S106, the encoding control unit 201 prohibits the lifting scalability in encoding of attribute data. Furthermore, as described above in <1. Encoding control>, the encoding control unit 201 signals control information such as Lifting_scalability_enabled_flag and geom_scaling_enabled_flag so as to correspond to these controls.

When the process of step 106 ends, the encoding control process ends.

Furthermore, when it is determined in step S104 not to apply the geometry scaling, the process proceeds to step S107.

In step S107, the encoding control unit 201 prohibits the geometry scaling in encoding of geometry data. Furthermore, in step S108, the encoding control unit 201 prohibits the lifting scalability in encoding of attribute data. Furthermore, as described above in <1. Encoding control>, the encoding control unit 201 signals control information such as Lifting_scalability_enabled_flag and geom_scaling_enabled_flag so as to correspond to these controls.

When the process of step S108 ends, the encoding control process ends.

By executing the encoding control process as described above, the encoding control unit 201 can more easily achieve scalable decoding of point cloud data.

<Flow of Encoding Process>

The encoding device 200 encodes data of a point cloud by executing an encoding process. An example of a flow of this encoding process will be described with reference to a flowchart of FIG. 19.

When the encoding process is started, in step S201, the geometry data encoding unit 211 of the encoding device 200 encodes geometry data of an inputted point cloud by executing a geometry data encoding process, to generate coded data of the geometry data.

In step S202, the geometry data decoding unit 212 decodes the coded data of the geometry data generated in step S201, to generate geometry data (a decoded result).

In step S203, the point cloud generation unit 213 performs a recoloring process by using the attribute data of the inputted point cloud and the geometry data (the decoded result) generated in step S202, to make the attribute data correspond to the geometry data.

In step S204, the attribute data encoding unit 214 encodes the attribute data subjected to the recoloring process in step S203 by executing an attribute data encoding process, to generate coded data of the attribute data.

In step S205, the bitstream generation unit 215 generates and outputs a bitstream including: the coded data of the geometry data generated in step S201; and the coded data of the attribute data generated in step S204.

When the processing in step S205 ends, the encoding process ends.

<Flow of Geometry Data Encoding Process>

Next, an example of a flow of the geometry data encoding process executed in step S201 of FIG. 19 will be described with reference to a flowchart of FIG. 20.

When the geometry data encoding process is started, the voxel generation unit 231 of the geometry data encoding unit 211 generates voxel data in step S221.

In step S222, the tree structure generation unit 232 generates a tree structure (an octree) of geometry data by using the voxel data generated in step S221.

In step S223, the selection unit 233 determines whether or not to perform the geometry scaling under control of the encoding control unit 201. When it is determined to perform the geometry scaling, the process proceeds to step S22.

In step S224, the geometry scaling unit 234 performs the geometry scaling on the geometry data (that is, the octree data) having the tree structure generated in step S222. When the process of step S224 ends, the process proceeds to step S225. Furthermore, when it is determined in step S223 not to perform the geometry scaling, the process of step S224 is skipped, and the process proceeds to step S225.

In step S225, the encoding unit 235 encodes the geometry data (that is, the octree data) having the tree structure generated in step S222 or the geometry data (that is, the octree data) subjected to the geometry scaling in step S224, to generate coded data of the geometry data.

Figure 19:
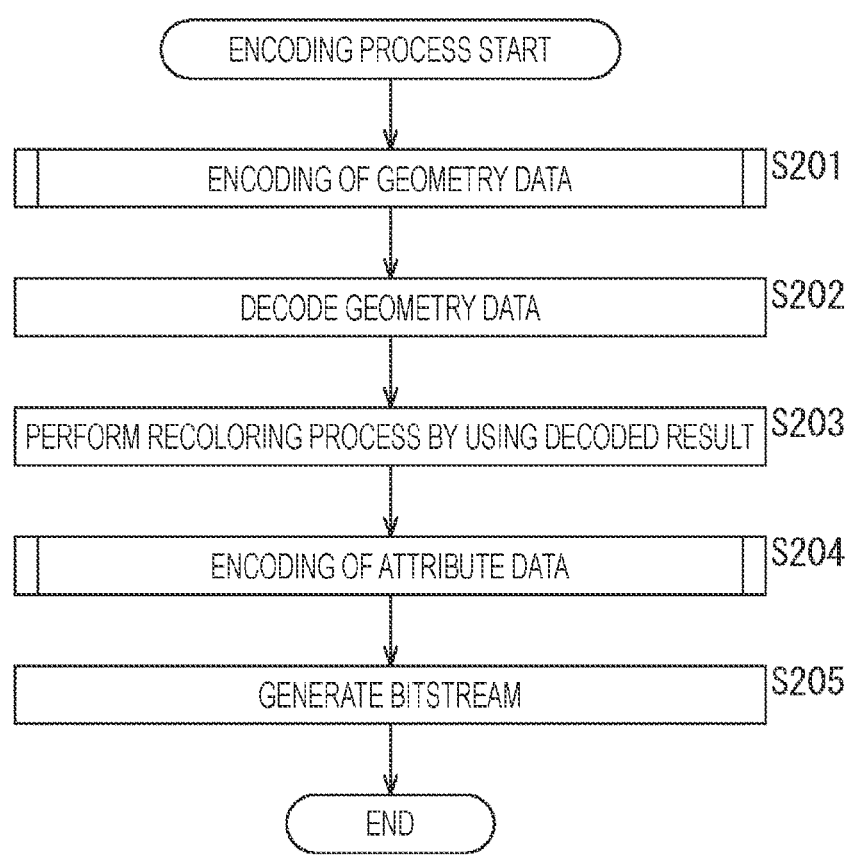
FIG. 19 is a flowchart illustrating an example of a flow of an encoding process.
Figure 20:
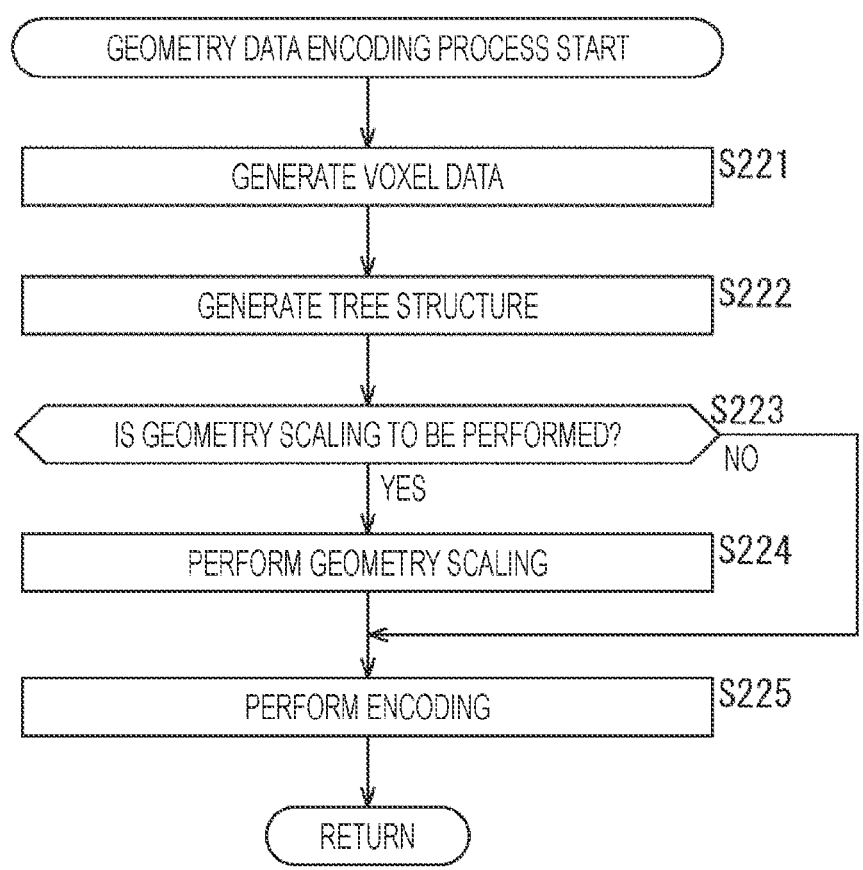
FIG. 20 is a flowchart illustrating an example of a flow of a geometry data encoding process.

When the process of step S225 ends, the geometry data encoding process ends, and the process returns to FIG. 19.

<Flow of Attribute Data Encoding Process>

Figure 21:
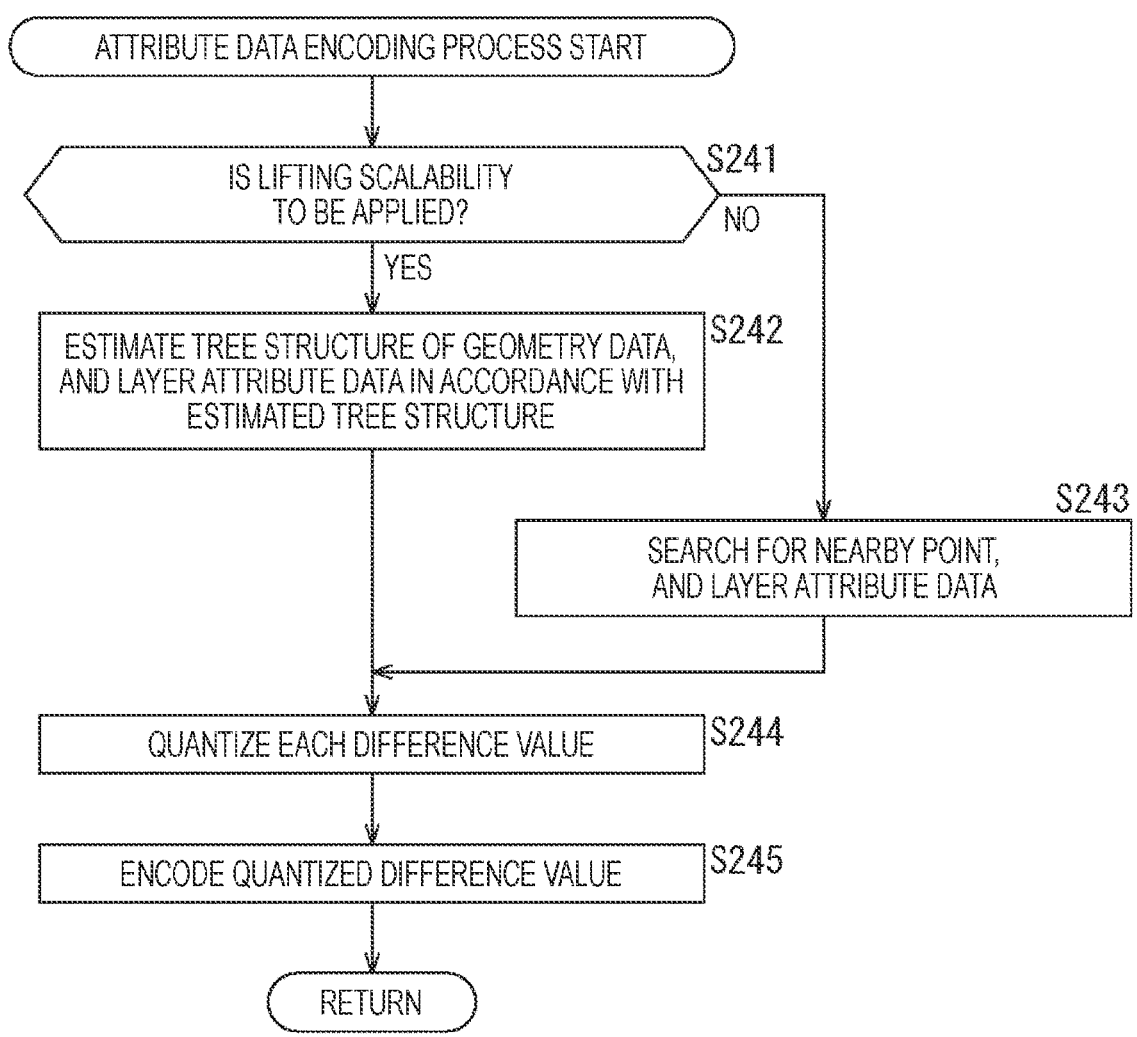
FIG. 21 is a flowchart illustrating an example of a flow of an attribute data encoding process.

Next, an example of a flow of the attribute data encoding process executed in step S204 of FIG. 19 will be described with reference to a flowchart of FIG. 21.

When the attribute data encoding process is started, in step S241, the selection unit 251 of the attribute data encoding unit 214 determines whether or not to apply the lifting scalability under control of the encoding control unit 201. When it is determined to apply the lifting scalability, the process proceeds to step S242.

In step S242, the scalable layering processing unit 252 performs lifting by the method described in Non Patent Document 2. That is, the scalable layering processing unit 252 estimates a tree structure of geometry data, and layers attribute data (forms a reference structure) in accordance with the estimated tree structure. Then, the scalable layering processing unit 252 derives a prediction value in accordance with the reference structure, and derives a difference value between the attribute data and the prediction value.

When the process of step S242 ends, the process proceeds to step S244. Furthermore, when it is determined in step S241 not to apply the lifting scalability, the process proceeds to step S243.

In step S243, the layering processing unit 253 performs lifting by the method described in Non Patent Document 4. That is, the layering processing unit 253 layers attribute data (forms a reference structure) independently of the tree structure of the geometry data. Then, the layering processing unit 253 derives a prediction value in accordance with the reference structure, and derives a difference value between the attribute data and the prediction value. When the process of step S243 ends, the process proceeds to step S244.

In step S244, the quantization unit 254 executes a quantization process to quantize each difference value derived in step S242 or step S243.

In step S245, the encoding unit 255 encodes the difference value quantized in step S244, to generate coded data of the attribute data. When the process of step S245 ends, the attribute data encoding process ends, and the process returns to FIG. 19.

By performing each process as described above, the encoding device 200 can more easily achieve scalable decoding of point cloud data.

3. Second Embodiment

<Decoding Device>

Figure 22:
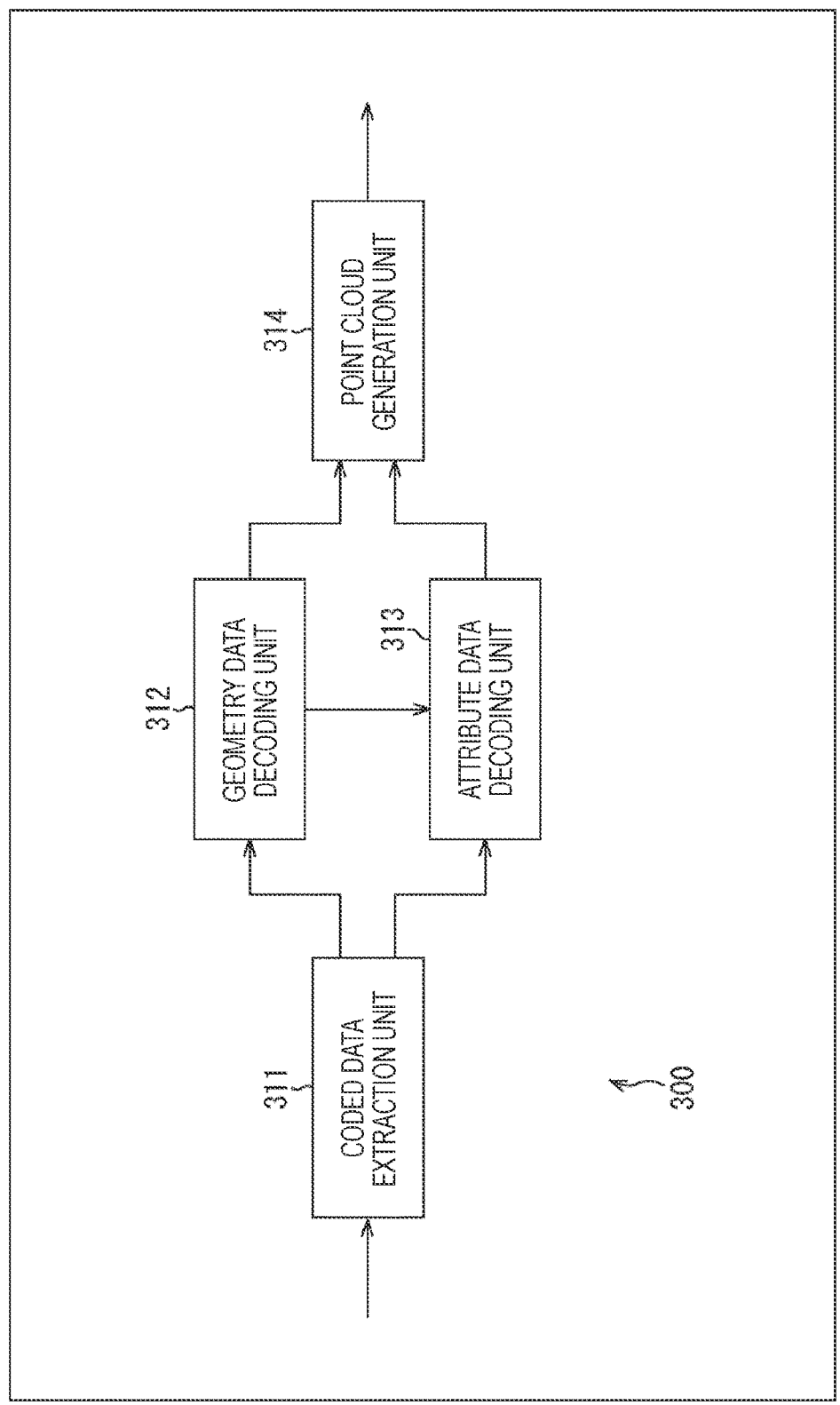
FIG. 22 is a block diagram illustrating a main configuration example of a decoding device.

FIG. 22 is a block diagram illustrating an example of a configuration of a decoding device, which is one aspect of an information processing apparatus to which the present technology is applied. A decoding device 300 illustrated in FIG. 22 is a device that decodes coded data of a point cloud (3D data). The decoding device 300 decodes, for example, coded data of a point cloud generated in the encoding device 200.

Note that, in FIG. 22, main parts of processing units, data flows, and the like are illustrated, and those illustrated in FIG. 22 are not necessarily all. That is, in the decoding device 300, there may be a processing unit not illustrated as a block in FIG. 22, or there may be a flow of processing or data not illustrated as an arrow or the like in FIG. 22.

As illustrated in FIG. 22, the decoding device 300 includes a coded data extraction unit 311, a geometry data decoding unit 312, an attribute data decoding unit 313, and a point cloud generation unit 314.

The coded data extraction unit 311 acquires and holds a bitstream inputted to the decoding device 300. From the held bitstream, the coded data extraction unit 311 extracts coded data of geometry data and attribute data from a highest level to a desired layer. When the coded data supports scalable decoding, the coded data extraction unit 311 can extract the coded data up to an intermediate layer. When the coded data does not support scalable decoding, the coded data extraction unit 311 extracts coded data of all layers.

The coded data extraction unit 311 supplies the extracted coded data of the geometry data to the geometry data decoding unit 312. The coded data extraction unit 311 supplies the extracted coded data of the attribute data to the attribute data decoding unit 313.

The geometry data decoding unit 312 acquires coded data of position information supplied from the coded data extraction unit 311. By performing a reverse process of the geometry data encoding process performed by the geometry data encoding unit 211 of the encoding device 200, the geometry data decoding unit 312 decodes the coded data of the geometry data, to generate geometry data (a decoded result). The geometry data decoding unit 312 supplies the generated geometry data (decoded result) to the attribute data decoding unit 313 and the point cloud generation unit 314.

The attribute data decoding unit 313 acquires the coded data of the attribute data supplied from the coded data extraction unit 311. The attribute data decoding unit 313 acquires the geometry data (the decoded result) supplied from the geometry data decoding unit 312. By performing a reverse process of the attribute data encoding process performed by the attribute data encoding unit 214 of the encoding device 200, the attribute data decoding unit 313 decodes the coded data of the attribute data by using the geometry data (the decoded result), to generate attribute data (a decoded result). The attribute data decoding unit 313 supplies the generated attribute data (decoded result) to the point cloud generation unit 314.

The point cloud generation unit 314 acquires the geometry data (the decoded result) supplied from the geometry data decoding unit 312. The point cloud generation unit 314 acquires the attribute data (the decoded result) supplied from the attribute data decoding unit 313. The point cloud generation unit 314 generates a point cloud (a decoded result) by using the geometry data (the decoded result) and the attribute data (the decoded result). The point cloud generation unit 314 outputs data of the generated point cloud (decoded result) to outside the decoding device 300.

By having the configuration as described above, the decoding device 300 can correctly decode coded data of point cloud data generated by the encoding device 200. That is, scalable decoding of point cloud data can be more easily achieved.

Note that these processing units (the coded data extraction unit 311 to the point cloud generation unit 314) have any configuration. For example, each processing unit may be configured by a logic circuit that implements the above-described processing. Furthermore, each of the processing units may include, for example, a CPU, a ROM, a RAM, and the like, and execute a program by using them to implement the above-described processing. Of course, each processing unit may have both of the configurations, implement a part of the above-described processing by the logic circuit, and implement other by executing the program. The configurations of the processing units may be independent from each other and, for example, some processing units may implement a part of the above-described processing by the logic circuit, some other processing units may implement the above-described processing by executing the program, and still some other processing units may implement the above-described processing by both the logic circuit and the execution of the program.

<Flow of Decoding Process>

Figure 23:
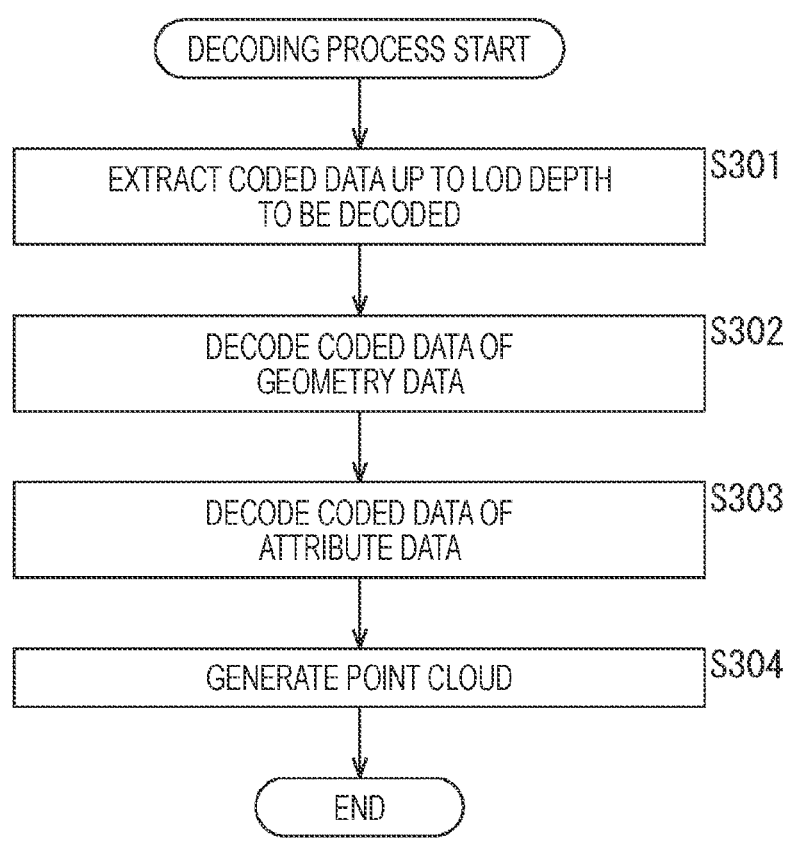
FIG. 23 is a flowchart for explaining an example of a flow of a decoding process.

Next, processing executed by the decoding device 300 will be described. The decoding device 300 decodes coded data of a point cloud by executing a decoding process. An example of a flow of the decoding process will be described with reference to a flowchart of FIG. 23.

When the decoding process is started, in step S301, the coded data extraction unit 311 of the decoding device 300 acquires and holds a bitstream, and extracts coded data of geometry data and attribute data up to an LoD depth to be decoded.

In step S302, the geometry data decoding unit 312 decodes the coded data of the geometry data extracted in step S301, to generate geometry data (a decoded result).

In step S303, the attribute data decoding unit 313 decodes the coded data of the attribute data extracted in step S301, to generate attribute data (a decoded result).

In step S304, the point cloud generation unit 314 generates and outputs a point cloud (a decoded result) by using the geometry data (the decoded result) generated in step S302 and the attribute data (the decoded result) generated in step S303.

When the process of step 3304 ends, the decoding process ends.

By performing the process of each step in this manner, the decoding device 300 can correctly decode coded data of point cloud data generated by the encoding device 200. That is, scalable decoding of point cloud data can be more easily achieved.

4. Supplementary Note

<Layering and Reverse Layering Method>

In the above description, lifting has been described as an example of a method of layering and reversely layering attribute data. However, a method of layering and reversely layering attribute data may be other than lifting, such as RAHT, for example.

<Control Information>

In each of the above embodiments, an enabled flag has been described as an example of control information regarding the present technology, but any control information may be signaled other than this.

<Around and Near>

Note that, in the present specification, a positional relationship such as "near" or "around" may include not only a spatial positional relationship but also a temporal positional relationship.

<Computer>

The series of processes described above can be executed by hardware or also executed by software. When the series of processes are performed by software, a program that configures the software is installed in a computer. Here, examples of the computer include, for example, a computer that is built in dedicated hardware, a general-purpose personal computer that can perform various functions by being installed with various programs, and the like.

Figure 24:
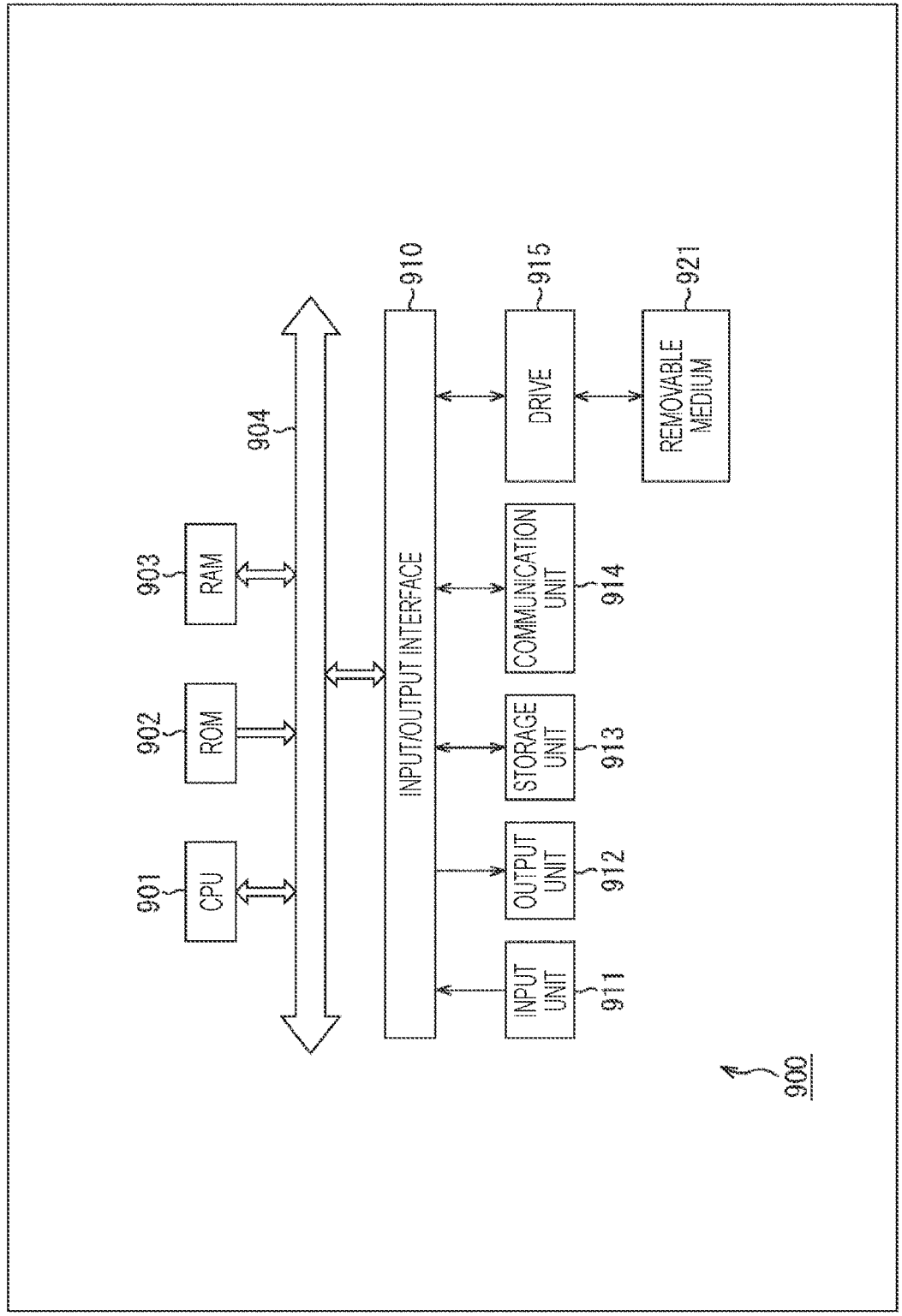
FIG. 24 is a block diagram illustrating a main configuration example of a computer.

FIG. 24 is a block diagram illustrating a configuration example of hardware of a computer that executes the series of processes described above in accordance with a program.

In a computer 900 illustrated in FIG. 24, a central processing unit (CPU) 901, a read only memory (ROM) 902, and a random access memory (RAM) 903 are mutually connected via a bus 904.

The bus 904 is further connected with an input/output interface 910. To the input/output interface 910, an input unit 911, an output unit 912, a storage unit 913, a communication unit 914, and a drive 915 are connected.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes, for example, a network interface or the like. The drive 915 drives a removable medium 921 such as a magnetic disk, an optical disk, a magneto-optical disk, or a semiconductor memory.

In the computer configured as described above, the series of processes described above are performed, for example, by the CPU 901 loading a program recorded in the storage unit 913 into the RAM 903 via the input/output interface 910 and the bus 904, and executing. The RAM 903 also appropriately stores data necessary for the CPU 901 to execute various processes, for example.

The program executed by the computer can be applied by being recorded on, for example, the removable medium 921 as a package medium or the like. In this case, by attaching the removable medium 921 to the drive 915, the program can be installed in the storage unit 913 via the input/output interface 910.

Furthermore, this program can also be provided via a wired or wireless transmission medium such as a local area network, the Internet, or digital satellite broadcasting. In this case, the program can be received by the communication unit 914 and installed in the storage unit 913.

Besides, the program can be installed in advance in the ROM 902 and the storage unit 913.

<Applicable Target of Present Technology>

The case where the present technology is applied to encoding and decoding of point cloud data has been described above, but the present technology can be applied to encoding and decoding of 3D data of any standard without limiting to these examples. For example, in encoding/decoding of mesh data, the mesh data may be converted into point cloud data, and the present technology may be applied to perform encoding/decoding. That is, as long as there is no contradiction with the present technology described above, any specifications may be adopted for various types of processing such as an encoding and decoding method and various types of data such as 3D data and metadata. Furthermore, as long as there is no contradiction with the present technology, some processes and specifications described above may be omitted.

Furthermore, in the above description, the encoding device 200 and the decoding device 300 have been described as application examples of the present technology, but the present technology can be applied to any configuration.

For example, the present technology may be applied to various electronic devices such as a transmitter or a receiver (for example, a television receiver or a mobile phone) in satellite broadcasting, cable broadcasting such as cable TV, distribution on the Internet, and distribution to a terminal by cellular communication, or a device (for example, a hard disk recorder or a camera) that records an image on a medium such as an optical disk, a magnetic disk, or a flash memory, or reproduces an image from these storage media.

Furthermore, for example, the present technology can also be implemented as a partial configuration of a device such as: a processor (for example, a video processor) as a system large scale integration (LSI) or the like; a module (for example, a video module) using a plurality of processors or the like; a unit (for example, a video unit) using a plurality of modules or the like; or a set (for example, a video set) in which other functions are further added to the unit.

Furthermore, for example, the present technology can also be applied to a network system including a plurality of devices. For example, the present technology may be implemented as cloud computing configured to perform processing in sharing and in cooperation by a plurality of devices via a network. For example, for any terminal such as a computer, an audio visual (AV) device, a portable information processing terminal, or an Internet of Things (IoT) device, the present technology may be implemented in a cloud service that provides a service related to an image (moving image).

Note that, in the present specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

<Field and Application to which Present Technology is Applicable>

A system, a device, a processing unit, and the like to which the present technology is applied can be utilized in any field such as, for example, transportation, medical care, crime prevention, agriculture, livestock industry, mining industry, beauty care, factory, household electric appliance, weather, natural monitoring, and the like. Furthermore, any application thereof may be adopted.

<Others>

Note that, in the present specification, "flag" is information for identifying a plurality of states, and includes not only information to be used for identifying two states of true (1) or false (0), but also information that enables identification of three or more states. Therefore, a value that can be taken by the "flag" may be, for example, a binary value of I/O, or may be a ternary value or more. Namely, the number of bits included in the "flag" can take any number, and may be 1 bit or a plurality of bits. Furthermore, for the identification information (including the flag), in addition to a form in which the identification information is included in a bitstream, a form is assumed in which difference information of the identification information with respect to a certain reference information is included in the bitstream. Therefore, in the present specification, the "flag" and the "identification information" include not only the information thereof but also the difference information with respect to the reference information.

Furthermore, various kinds of information (such as metadata) related to coded data (a bitstream) may be transmitted or recorded in any form as long as it is associated with the coded data. Here, the term "associating" means, when processing one data, allowing other data to be used (to be linked), for example. That is, the data associated with each other may be combined as one data or may be individual data. For example, information associated with coded data (an image) may be transmitted on a transmission line different from the coded data (the image). Furthermore, for example, information associated with the coded data (the image) may be recorded on a recording medium different from the coded data (the image) (or another recording region of the same recording medium). Note that this "association" may be for a part of the data, rather than the entire data. For example, an image and information corresponding to the image may be associated with each other in any unit such as a plurality of frames, one frame, or a part within a frame.

Note that, in the present specification, terms such as "synthesize", "multiplex", "add", "integrate", "include", "store", "put in", "introduce", "insert", and the like mean, for example, to combine a plurality of objects into one, such as to combine coded data and metadata into one data, and mean one method of "associating" described above.

Furthermore, the embodiments of the present technology are not limited to the above-described embodiments, and various modifications can be made without departing from the scope of the present technology.

For example, a configuration described as one device (or processing unit) may be segmented and configured as a plurality of devices (or processing units). On the contrary, a configuration described above as a plurality of devices (or processing units) may be collectively configured as one device (or processing unit). Furthermore, as a matter of course, a configuration other than the above may be added to a configuration of each device (or each processing unit). Moreover, as long as a configuration and an operation of the entire system are substantially the same, a part of a configuration of one device (or processing unit) may be included in a configuration of another device (or another processing unit).

Furthermore, for example, the above-described program may be executed in any device. In that case, the device is only required to have a necessary function (a functional block or the like) such that necessary information can be obtained.

Furthermore, for example, each step of one flowchart may be executed by one device, or may be shared and executed by a plurality of devices. Moreover, when one step includes a plurality of processes, the plurality of processes may be executed by one device or may be shared and executed by a plurality of devices. In other words, a plurality of processes included in one step can be executed as a plurality of steps. On the contrary, a process described as a plurality of steps can be collectively executed as one step.

Furthermore, for example, in a program executed by the computer, process of steps describing the program may be executed in chronological order in the order described in the present specification, or may be executed in parallel or individually at a required timing such as when a call is made. That is, as long as no contradiction occurs, processing of each step may be executed in an order different from the order described above. Moreover, this process of steps describing program may be executed in parallel with processing of another program, or may be executed in combination with processing of another program.

Furthermore, for example, a plurality of techniques related to the present technology can be implemented independently as a single body as long as there is no contradiction. Of course, any of the plurality of present technologies can be used in combination. For example, a part or all of the present technology described in any embodiment can be implemented in combination with a part or all of the present technology described in another embodiment. Furthermore, a part or all of the present technology described above may be implemented in combination with another technology not described above.

Note that the present technology can also have the following configurations.

(1) An information processing apparatus including:
 an encoding control unit configured to perform control to prohibit combined use of scalable encoding that is an encoding method for generating scalably decodable coded data and scaling encoding that is an encoding method involving a change in a tree structure of geometry data, in encoding of a point cloud representing an object having a three-dimensional shape as a set of points.

(2) The information processing apparatus according to (1), in which
 the scalable encoding is lifting scalability for encoding of attribute data by lifting with a reference structure similar to a tree structure of the geometry data.

(3) The information processing apparatus according to (1) or (2), in which
 the scaling encoding is geometry scaling for scaling and encoding of the geometry data.

(4) The information processing apparatus according to any one of (1) to (3), in which
 the encoding control unit performs control to prohibit application of the scaling encoding in a case of applying the scalable encoding.

(5) The information processing apparatus according to (4), in which
 the encoding control unit controls signaling of: a scalable encoding enabled flag that is flag information regarding application of the scalable encoding; and a scaling encoding enabled flag that is flag information regarding application of the scaling encoding.

(6) The information processing apparatus according to (5), in which
 in a case of signaling the scalable encoding enabled flag of a value indicating application of the scalable encoding, the encoding control unit performs control to signal the scaling encoding enabled flag of a value indicating non-application of the scaling encoding.

(7) The information processing apparatus according to (5) or (6), in which
in a case of applying the scalable encoding, the encoding control unit performs control to signal, in a profile, the scalable encoding enabled flag of a value indicating application of the scalable encoding and the scaling encoding enabled flag of a value indicating non-application of the scaling encoding.

(8) The information processing apparatus according to any one of (5) to (7) in which
the encoding control unit performs control to omit signaling of the scaling encoding enabled flag in a case of signaling the scalable encoding enabled flag of a value indicating application of the scalable encoding.

(9) The information processing apparatus according to any one of (1) to (3), in which
the encoding control unit performs control to prohibit application of the scalable encoding, in a case of applying the scaling encoding.

(10) The information processing apparatus according to (9), in which
the encoding control unit controls signaling of: a scaling encoding enabled flag that is flag information regarding application of the scaling encoding; and a scalable encoding enabled flag that is flag information regarding application of the scalable encoding.

(11) The information processing apparatus according to (10), in which
in a case of signaling the scaling encoding enabled flag of a value indicating application of the scaling encoding, the encoding control unit performs control to signal the scalable encoding enabled flag of a value indicating non-application of the scalable encoding.

(12) The information processing apparatus according to (10) or (11), in which
in a case of applying the scaling encoding, the encoding control unit performs control to signal, in a profile, the scaling encoding enabled flag of a value indicating application of the scaling encoding, and the scalable encoding enabled flag of a value indicating non-application of the scalable encoding.

(13) The information processing apparatus according to any one of (10) to (12), in which
the encoding control unit performs control to omit signaling of the scalable encoding enabled flag, in a case of signaling the scaling encoding enabled flag of a value indicating application of the scaling encoding.

(14) The information processing apparatus according to any one of (1) to (13), further including:
a geometry data encoding unit configured to encode the geometry data of the point cloud under control of the encoding control unit, to generate coded data of the geometry data; and
an attribute data encoding unit configured to encode the attribute data of the point cloud under control of the encoding control unit, to generate coded data of the attribute data.

(15) The information processing apparatus according to (14), in which
the geometry data encoding unit includes:
a selection unit configured to select whether to apply scaling of the geometry data under control of the encoding control unit;
a geometry scaling unit configured to perform scaling and merging of the geometry data when application of scaling of the geometry data is selected by the selection unit; and
an encoding unit configured to encode the geometry data subjected to the scaling and the merging by the geometry scaling unit when application of scaling of the geometry data is selected by the selection unit, and to encode the geometry data not subjected to the scaling and the merging when non-application of scaling of the geometry data is selected by the selection unit.

(16) The information processing apparatus according to (15), in which
the geometry data encoding unit further includes:
a tree structure generation unit configured to generate a tree structure of the geometry data, and
the geometry scaling unit updates the tree structure generated by the tree structure generation unit by performing the scaling and the merging.

(17) The information processing apparatus according to any one of (14) to (16), in which
the attribute data encoding unit includes:
a selection unit configured to select whether to apply scalable layering for lifting the attribute data with a reference structure similar to a tree structure of the geometry data, under control of the encoding control unit;
a scalable layering unit configured to perform the scalable layering on the attribute data, when application of the scalable layering is selected by the selection unit; and
an encoding unit configured to encode the attribute data subjected to the scalable layering by the scalable layering unit when application of the scalable layering is selected by the selection unit, and to encode the attribute data not subjected to the scalable layering when non-application of the scalable layering is selected by the selection unit.

(18) The information processing apparatus according to any one of (14) to (17), further including:
a geometry data decoding unit configured to decode coded data of the geometry data generated by the geometry data encoding unit, to generate the geometry data; and
a recoloring processing unit configured to perform a recoloring process on the attribute data by using the geometry data generated by the geometry data decoding unit, in which
the attribute data encoding unit encodes the attribute data subjected to the recoloring process by the recoloring process unit.

(19) The information processing apparatus according to any one of (14) to (18), further including:
a bitstream generation unit configured to generate a bitstream, the bitstream including coded data of the geometry data generated by the geometry data encoding unit and coded data of the attribute data generated by the attribute data encoding unit.

(20) An information processing method including:
performing control to prohibit combined use of scalable encoding that is an encoding method for generating scalably decodable coded data and scaling encoding that is an encoding method involving a change in a tree structure of geometry data, in encoding of a point cloud representing an object having a three-dimensional shape as a set of points.

REFERENCE SIGNS LIST

200 Encoding device
201 Encoding control unit
211 Geometry data encoding unit
212 Geometry data decoding unit
213 Point cloud generation unit
214 Attribute data encoding unit
215 Bitstream generation unit
231 Voxel generation unit
232 Tree structure generation unit
233 Selection unit
234 Geometry scaling unit
235 Encoding unit
251 Selection unit
252 Scalable layering processing unit
253 Layering processing unit
254 Quantization unit
255 Encoding unit
300 Decoding device
311 Coded data extraction unit
312 Geometry data decoding unit
313 Attribute data decoding unit
314 Point cloud generation unit

The invention claimed is:

1. An encoding apparatus for a point cloud representing a three-dimensional object, the encoding apparatus comprising:
circuitry configured to prohibit combined use of
scalable encoding for generating scalably decodable coded data, and
scaling encoding to scale geometry data of the point cloud having a tree structure,
wherein the prohibiting of the combined use includes applying the scalable encoding by signaling a scalable encoding enabled flag having a value larger than 0 while prohibiting the scaling encoding on a basis of control of signaling of a scaling encoding enabled flag representing whether the scaling encoding is applied.

2. The encoding apparatus according to claim 1, wherein the scalable encoding includes lifting scalability for encoding of attribute data by lifting with a reference structure corresponding to the tree structure.

3. The encoding apparatus according to claim 1, wherein the circuitry is further configured to signal the scalable encoding enabled flag having the value larger than 0 while prohibiting the scaling encoding by signaling the scaling encoding enabled flag having a value indicating 0 representing non-application of the scaling encoding.

4. The encoding apparatus according to claim 1, wherein the scalable encoding enabled flag and the scaling encoding enabled flag are specified in a profile for a point cloud compression.

5. The encoding apparatus according to claim 1, wherein the control of signaling of the scaling encoding enabled flag includes omitting signaling of the scaling encoding enabled flag when the scalable encoding is applied.

6. The encoding apparatus according to claim 1, wherein the prohibiting of the combined use further includes applying the scaling encoding by signaling the scaling encoding enabled flag having a value larger than 0 while prohibiting the scalable encoding on a basis of control of signaling of the scalable encoding enabled flag representing whether the scalable encoding is applied.

7. The encoding apparatus according to claim 6, wherein the circuitry is configured to signal the scaling encoding enabled flag having the value larger than 0 while prohibiting the scalable encoding by signaling the scalable encoding enabled flag having a value indicating 0 representing non-application of the scalable encoding.

8. The encoding apparatus according to claim 6, wherein the control of signaling of the scalable encoding enabled flag includes omitting signaling of the scalable encoding enabled flag when the scaling encoding is applied.

9. An encoding apparatus for a point cloud representing a three-dimensional object, the encoding apparatus comprising:
circuitry configured to
prohibit combined use of
scalable encoding for generating scalably decodable coded data, and
scaling encoding to scale geometry data of the point cloud having a tree structure, and
encode, on a basis of the prohibiting of the combined use,
the geometry data, and
attribute data of the point cloud, to generate coded data of the geometry data and coded data of the attribute data,
wherein the prohibiting of the combined use includes at least one of
applying the scalable encoding by signaling a scalable encoding enabled flag having a value larger than 0 while prohibiting the scaling encoding on a basis of control of signaling of a scaling encoding enabled flag representing whether the scaling encoding is applied, or
applying the scaling encoding by signaling the scaling encoding enabled flag having a value larger than 0 while prohibiting the scalable encoding on a basis of control of signaling of the scalable encoding enabled flag representing whether the scalable encoding is applied.

10. The encoding apparatus according to claim 9, wherein the circuitry is further configured to
encode, when applying the scaling encoding of the geometry data, the geometry data while performing scaling and merging of the geometry data, and
encode, when not applying the scaling encoding of the geometry data, the geometry data without performing the scaling and the merging of the geometry data.

11. The encoding apparatus according to claim 10, wherein the circuitry is further configured to
generate the tree structure of the geometry data, and
update the tree structure by performing the scaling and the merging.

12. The encoding apparatus according to claim 9, wherein the circuitry is further configured to
select, based on the prohibiting of the combined use, whether to apply scalable layering for lifting the attribute data with a reference structure corresponding to the tree structure of the geometry data,
encode the attribute data subjected to the scalable layering when applying the scalable layering, and
encode the attribute data not subjected to the scalable layering when not applying the scalable layering.

13. The encoding apparatus according to claim 9,
wherein the circuitry is further configured to
  decode coded data of the geometry data to generate decoded geometry data,
  perform a recoloring process on the attribute data on a basis of the decoded geometry data, and
  encode the attribute data subjected to the recoloring process.

14. The encoding apparatus according to claim 9,
wherein the circuitry is further configured to generate a bitstream including the coded data of the geometry data and the coded data of the attribute data.

15. An encoding apparatus for a point cloud representing a three-dimensional object, the encoding apparatus comprising:
  circuitry configured to prohibit combined use of:
    scalable encoding for generating scalably decodable coded data; and
    scaling encoding to scale geometry data of the point cloud having a tree structure,
  wherein the prohibiting of the combined use includes applying the scaling encoding by signaling a scaling encoding enabled flag having a value larger than 0 while prohibiting the scalable encoding on a basis of control of signaling of a scalable encoding enabled flag representing whether the scalable encoding is applied.

16. The encoding apparatus according to claim 15,
wherein the circuitry is configured to signal the scaling encoding enabled flag having the value larger than 0 while prohibiting the scalable encoding by signaling the scalable encoding enabled flag having a value indicating 0 representing non-application of the scalable encoding.

17. The encoding apparatus according to claim 15,
wherein the control of signaling of the scalable encoding enabled flag includes omitting signaling of the scalable encoding enabled flag when the scaling encoding is applied.

18. An encoding method for a point cloud representing a three-dimensional object, the encoding method comprising:
  prohibiting combined use of:
    scalable encoding for generating scalably decodable coded data; and
    scaling encoding to scale geometry data of the point cloud having a tree structure,
  wherein the prohibiting of the combined use includes applying the scaling encoding by signaling a scaling encoding enabled flag having a value larger than 0 while prohibiting the scalable encoding on a basis of control of signaling of a scalable encoding enabled flag representing whether the scalable encoding is applied.

19. The encoding method according to claim 18, further comprising:
  signaling the scaling encoding enabled flag having the value larger than 0 while prohibiting the scalable encoding by signaling the scalable encoding enabled flag having a value indicating 0 representing non-application of the scalable encoding.

20. The encoding method according to claim 18, further comprising:
  omitting, as the control of signaling of the scalable encoding enabled flag, signaling of the scalable encoding enabled flag when the scaling encoding is applied.

* * * * *